United States Patent
Park et al.

(10) Patent No.: US 11,770,222 B2
(45) Date of Patent: *Sep. 26, 2023

(54) MAXIMUM SENSITIVITY DEGRADATION FOR CARRIER AGGREGATION

(71) Applicant: LG Electronics Inc., Seoul (KR)

(72) Inventors: Jongkeun Park, Seoul (KR); Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,980

(22) Filed: Apr. 19, 2022

(65) Prior Publication Data

US 2022/0255684 A1 Aug. 11, 2022

Related U.S. Application Data

(63) Continuation of application No. 16/830,009, filed on Mar. 25, 2020, now Pat. No. 11,336,406.

(30) Foreign Application Priority Data

Mar. 29, 2019 (KR) .......................... 10-2019-0037005

(51) Int. Cl.
*H04L 5/00* (2006.01)
*H04W 52/36* (2009.01)

(52) U.S. Cl.
CPC ........... *H04L 5/001* (2013.01); *H04W 52/367* (2013.01)

(58) Field of Classification Search
CPC ... H04L 5/001; H04W 52/367; H04B 17/3912
See application file for complete search history.

(56) References Cited

U.S. PATENT DOCUMENTS

| | | | |
|---|---|---|---|
| 10,575,321 B1* | 2/2020 | Wiatrowski | H04W 48/16 |
| 11,336,406 B2* | 5/2022 | Park | H04L 5/001 |
| 2009/0154614 A1* | 6/2009 | Storm | H04B 1/406 |
| | | | 455/266 |
| 2013/0016633 A1* | 1/2013 | Lum | H04B 1/16 |
| | | | 370/297 |
| 2013/0273861 A1* | 10/2013 | See | H04B 1/44 |
| | | | 455/83 |
| 2015/0271852 A1* | 9/2015 | Rahman | H04W 74/0833 |
| | | | 370/329 |
| 2017/0054535 A1* | 2/2017 | Lim | H04W 72/0453 |
| 2017/0318587 A1* | 11/2017 | Lim | H04L 5/001 |

(Continued)

*Primary Examiner* — Christine Ng
(74) *Attorney, Agent, or Firm* — Fish & Richardson P.C.

(57) ABSTRACT

One general aspect of the present disclosure includes a device configured to operate in a wireless system. The device including: a transceiver configured with a plurality of E-UTRA operating bands; and a processor operably connectable to the transceiver. The processer may be configured to: control the transceiver to transmit an uplink signal via at least two bands among the plurality of E-UTRA operating bands; and control the transceiver to receive a downlink signal via three bands among the plurality of E-UTRA operating bands, wherein pre-configured MSD value is applied to a reference sensitivity for receiving the downlink signal based on the E-UTRA operating band 2.

11 Claims, 23 Drawing Sheets

(56) References Cited

U.S. PATENT DOCUMENTS

2018/0091186 A1* 3/2018 Lim ................ H04L 5/0037
2018/0159563 A1* 6/2018 Khlat ............... H01Q 3/24
2020/0008069 A1* 1/2020 Zhu ................ H04W 16/14

* cited by examiner

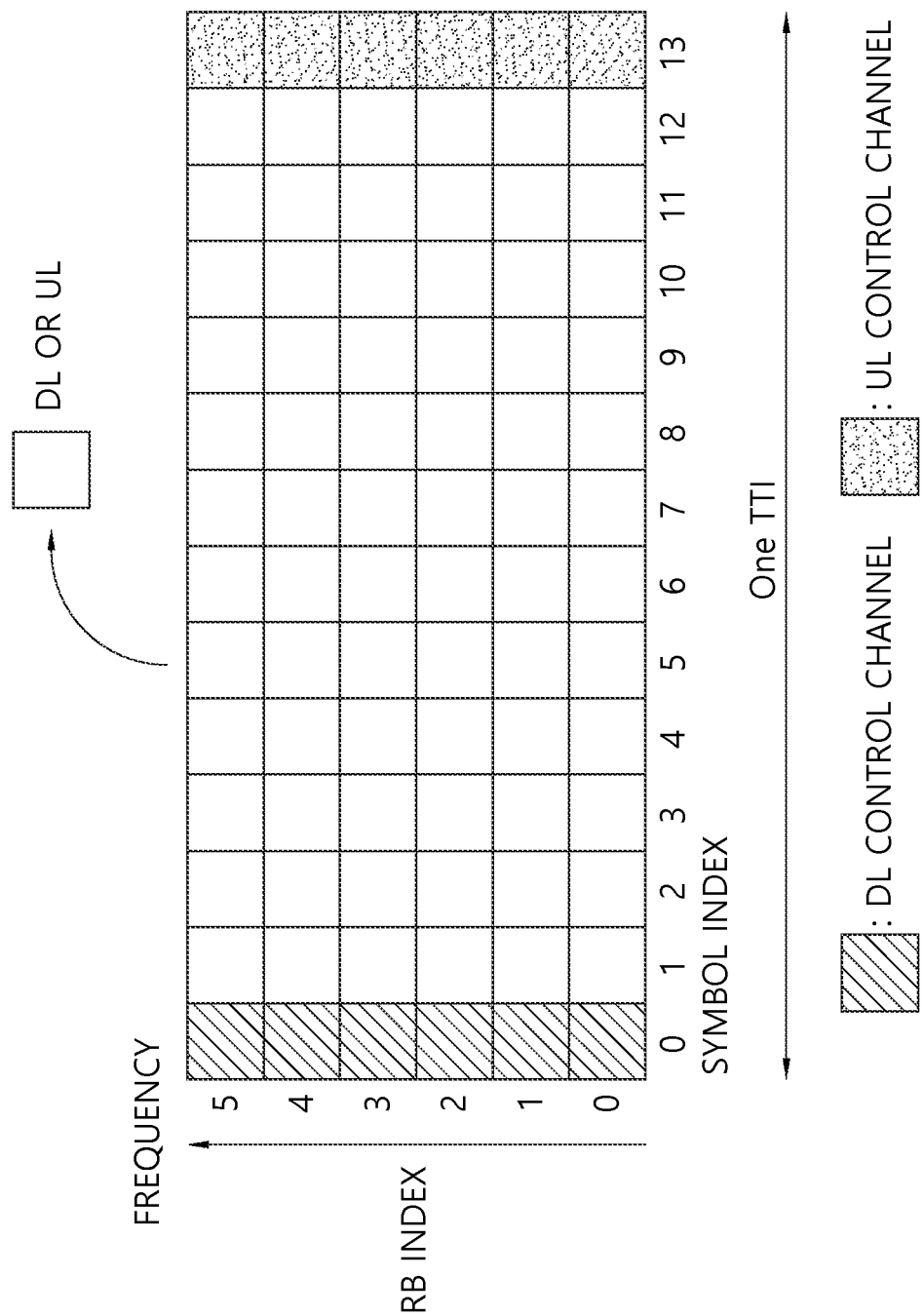

MAXIMUM SENSITIVITY DEGRADATION FOR CARRIER AGGREGATION

CROSS-REFERENCE TO RELATED APPLICATIONS

This application is a continuation of U.S. application Ser. No. 16/830,009, filed on Mar. 25, 2020, which claims the benefit pursuant to 35 U.S.C. § 119 (e) of Korean Patent Application No. 10-2019-0037005, filed on Mar. 29, 2019, the contents of which are all hereby incorporated by reference herein in their entirety.

TECHNICAL FIELD

The present disclosure generally relates to mobile communication.

BACKGROUND

With the success in the Evolved Universal Terrestrial Radio Access Network (E-UTRAN) for $4^{th}$ generation mobile communication, i.e., long term evolution (LTE)/LTE-Advanced (LTE-A), interest in the next-generation, i.e., $5^{th}$ generation (also known as 5G) mobile communication is rising, and extensive research and development are in process.

A new radio access technology (New RAT or NR) is being researched for the 5th generation (also known as 5G) mobile communication.

SUMMARY

One general aspect of the present disclosure includes a device configured to operate in a wireless system. The device including: a transceiver configured with a plurality of E-UTRA operating bands; and a processor operably connectable to the transceiver. The processer may be configured to: control the transceiver to transmit an uplink signal via at least two bands among the plurality of E-UTRA operating bands; and control the transceiver to receive a downlink signal via three bands among the plurality of E-UTRA operating bands, wherein the three bands include at least an E-UTRA operating band 2 and the two bands, wherein the two bands include two of E-UTRA operating bands 13, 48, and 66, wherein the three bands and the two bands are configured for CA, and wherein pre-configured MSD value is applied to a reference sensitivity for receiving the downlink signal based on the E-UTRA operating band 2. Other embodiments of this aspect include corresponding computer systems, apparatus, and computer programs recorded on one or more computer storage devices, each configured to perform the actions of the methods.

Another general aspect of the present disclosure includes a method performed by a device operating in a wireless communication system. The method may include: transmitting an uplink signal via at least two bands among a plurality of E-UTRA operating bands, wherein the device is configured with the plurality of E-UTRA operating bands; receiving a downlink signal via three bands among the plurality of E-UTRA operating bands, wherein the three bands include at least an E-UTRA operating band 2 and the two bands, wherein the two bands include two of E-UTRA operating bands 13, 48, and 66, wherein the three bands and the two bands are configured for CA, and wherein pre-configured MSD value is applied to a reference sensitivity for receiving the downlink signal based on the E-UTRA operating band 2. Other embodiments of this aspect include corresponding computer systems, apparatus, and computer programs recorded on one or more computer storage devices, each configured to perform the actions of the methods.

Another general aspect of the present disclosure includes a processing apparatus configured to control a wireless communication device. The processing apparatus may include: at least one processor; and at least one computer memory operably connectable to the at least one processor and storing instructions that, based on being executed by the at least one processor, perform operations comprising: obtaining downlink signal based on three downlink operating bands, wherein the three downlink operating bands include Evolved UMTS (Universal Mobile Telecommunications System) Terrestrial Radio Access (E-UTRA) operating band 2 and two operating bands among E-UTRA operating bands 13, 48, and 66, wherein the two operating bands are used as two uplink operating bands for transmitting uplink signal, wherein the three downlink operating bands and the two uplink operating bands are configured for CA (Carrier Aggregation), and wherein pre-configured MSD (Maximum Sensitivity Degradation) value is applied to a reference sensitivity for receiving the downlink signal based on the E-UTRA operating band 2. Other embodiments of this aspect include corresponding computer systems, apparatus, and computer programs recorded on one or more computer storage devices, each configured to perform the actions of the methods.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE FIGURES

FIG. 4 shows an example of subframe type in NR.

DETAILED DESCRIPTION

Figure 1:
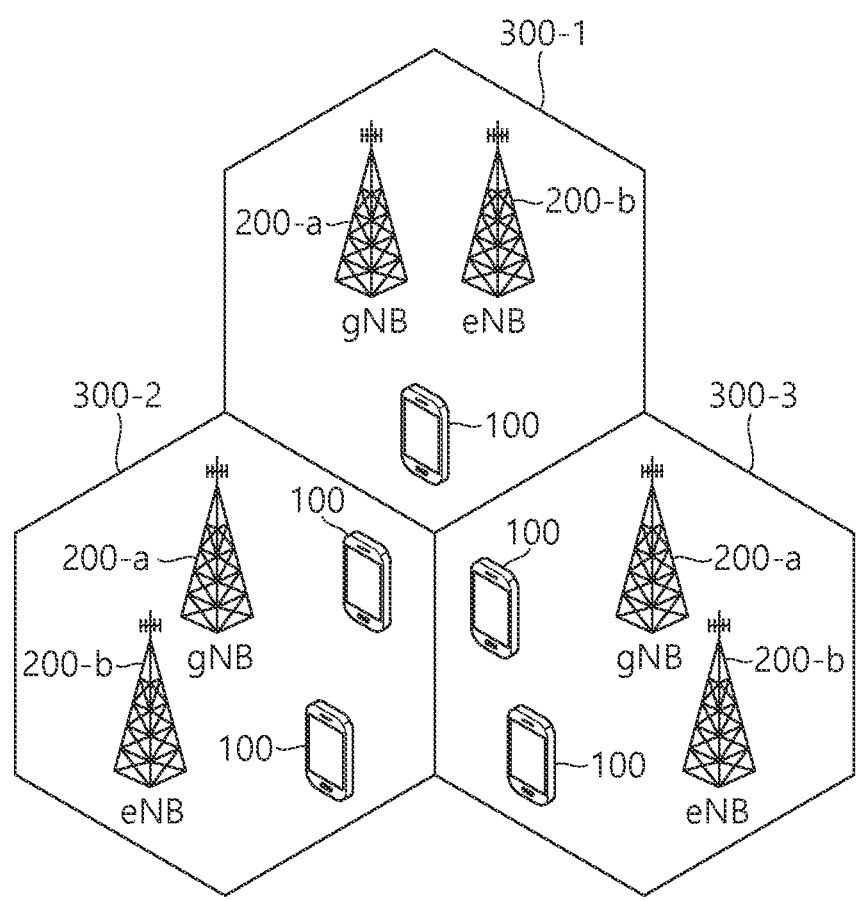
FIG. 1 illustrates an example of wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

Implementations of the present disclosure may be applied to various types of wireless communication systems, such as the 3rd Generation Partnership Project (3GPP) long term evolution (LTE), 3GPP LTE-advanced (LTE-A), 3GPP 5G (5th generation) or 3GPP New Radio (NR). These are just some examples, and implementations of the present disclosure may be applied to various other types of wireless communication systems. Hereinafter, LTE includes LTE and/or LTE-A.

In the appended drawings, although a User Equipment (UE) is illustrated as an example, this is merely an example given to simplify the description of the present disclosure. Herein, a UE may be a wireless communication device performing communication in a communication system such as EPS and/or 5GS, and so on. The UE shown in the drawings may also be referred to as a terminal, a mobile equipment (ME), a wireless communication device, a wireless communication apparatus, and so on. In some implementations, the UE may be implemented as a portable device, such as a laptop computer, a mobile phone, a PDA, a smart phone, a multimedia device, and so on. Alternatively, in some implementations, the UE may be implemented as a non-portable device, such as a personal computer (PC) or a vehicle mounted device.

Although the examples in the present disclosure are described based on a Universal Mobile Telecommunication System (UMTS), an Evolved Packet Core (EPC), and a next generation (also known as $5^{th}$ generation or 5G) mobile communication network, implementations of the present disclosure are not limited to the aforementioned communication systems and may be applied to various other types of communication systems and techniques.

Description of Terms

Hereinafter, prior to describing the present disclosure with reference to the appended drawings, in order to facilitate understanding of the present disclosure, various terms used in this disclosure will be briefly described.

UE/MS: This refers to a User Equipment/Mobile Station, UE.

EPS: This is an abbreviation for an Evolved Packet System, which to a core network supporting a Long Term Evolution (LTE) network. This network is an evolved form of the UMTS.

Public Data Network (PDN): This is an independent network in which a server providing a service is located.

Packet Data Network Gateway (PDN-GW): This is a network node of an EPS network performing functions of UE IP address allocation, packet screening and filtering, and charging data collection.

Serving Gateway (Serving GW): This is a network node of an EPS network performing functions of mobility anchor, packet routing, Idle mode packet buffering, and triggering MME to page a UE.

eNodeB (eNB): This is a base station of an Evolved Packet System (EPS), which is installed in the outdoors, and the size of its cell coverage corresponds to a macro cell.

MME: This is an abbreviation for a Mobility Management Entity, which performs a role of controlling each entity within the EPS in order to provide a session and mobility for the UE.

Session: A session refers to a path for performing data transmission, and its unit may be a PDN, a Bearer, an IP flow unit, and so on. As defined in the 3rd Generation Partnership Project (3GPP), the difference between each unit may be differentiated as an entire (or whole) target network unit (APN or PDN unit), units being differentiated by QoS within the entire (or whole) target network unit (Bearer units), and destination IP address units.

APN: This is an abbreviation for an Access Point Name, which is the name of an access point being managed by the network, and this name is provided to the UE. More specifically, this is a character string indicating or identifying a PDN. A corresponding P-GW needs to be passed through in order to access a requested service or network (PDN). And, the APN is a name (character string) that is defined in advance in order to find (or locate) the P-GW. For example, the APN may be defined as internet.mnc012.mcc345.gprs.

PDN connection: This indicates a connection from the UE to the PDN, i.e., a relation (connection) between a UE, which is expressed as an IP address, and a PDN, which is expressed as an APN. This denotes a connection (UE (100)-PDN GW) between entities within the core network so that a session can be configured.

UE Context: This refers to situation information of the UE, i.e., situation information configured of UE id, mobility (current location, and so on), and session attribute (QoS, priority level, and so on), being used for managing the UE in a network.

Non-Access-Stratum (NAS): This denotes an upper stratum of a control plane between UE and MME. This supports mobility management, session management, IP address maintenance, and so on, between the UE and the network.

PLMN: This is an abbreviation for a Public Land Mobile Network, which denotes a network identification number of an operator. In a roaming situation of a UE, the PLMN may be differentiated as a Home PLMN (HPLMN) and a Visited PLMN (VPLMN).

DNN: This is an abbreviation for a Data Network Name, which is the name of an access point being similarly managed by the network as the APN. And, this name is provided to the UE. In a 5G system, the DNN is used as an equivalent of the APN.

The following description of this specification may be applied to a next-generation (also known as $5^{th}$ generation or 5G) mobile communication network.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

FIG. 1 Illustrates an Example of Wireless Communication System.

As seen with reference to FIG. 1, the wireless communication system includes at least one base station (BS). The BS is classified into a gNB 20a and an eNB 20b. The gNB 20a is for 5G mobile communication such as NR. And, the eNB 20b is for 4G mobile communication such as LTE or LTE-A.

Each BS (e.g., gNB 20a and eNB 20b) provides a communication service to specific geographical areas (generally, referred to as cells) 20-1, 20-2, and 20-3. The cell can be further divided into a plurality of areas (sectors).

The UE 10 generally belongs to one cell and the cell to which the UE belong is referred to as a serving cell. A BS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 20 to the UE 10 and an uplink means communication from the UE 10 to the BS 200. In the downlink, a transmitter may be a part of the BS 20 and a receiver may be a part of the UE 10. In the uplink, the transmitter may be a part of the UE 10 and the receiver may be a part of the BS 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Figure 2A:
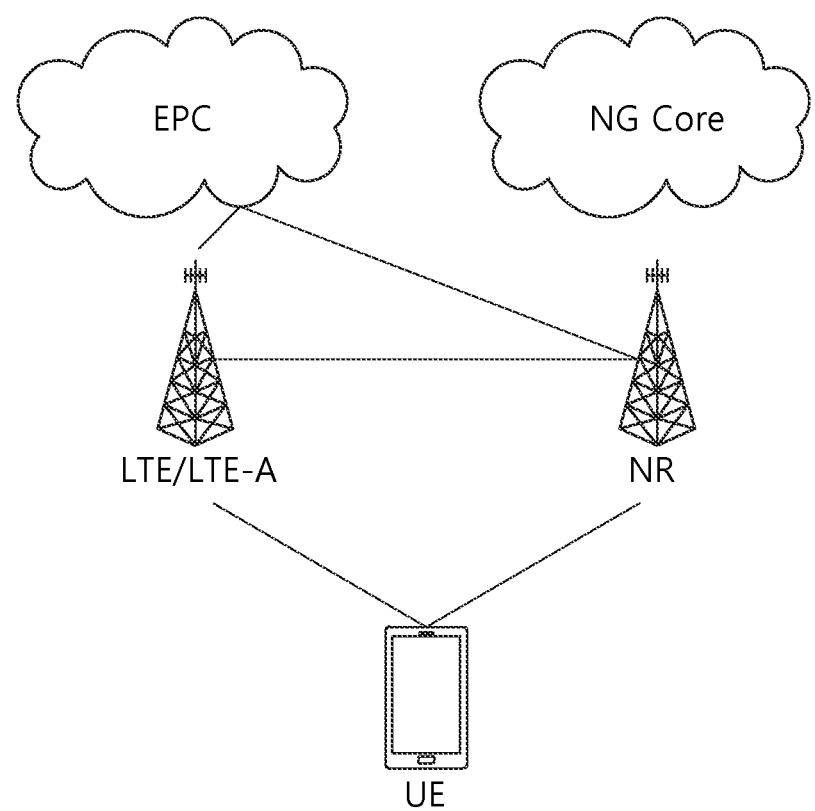
FIGS. 2a to 2c are exemplary diagrams illustrating exemplary architectures for services of the next generation mobile communication.
Figure 2B:
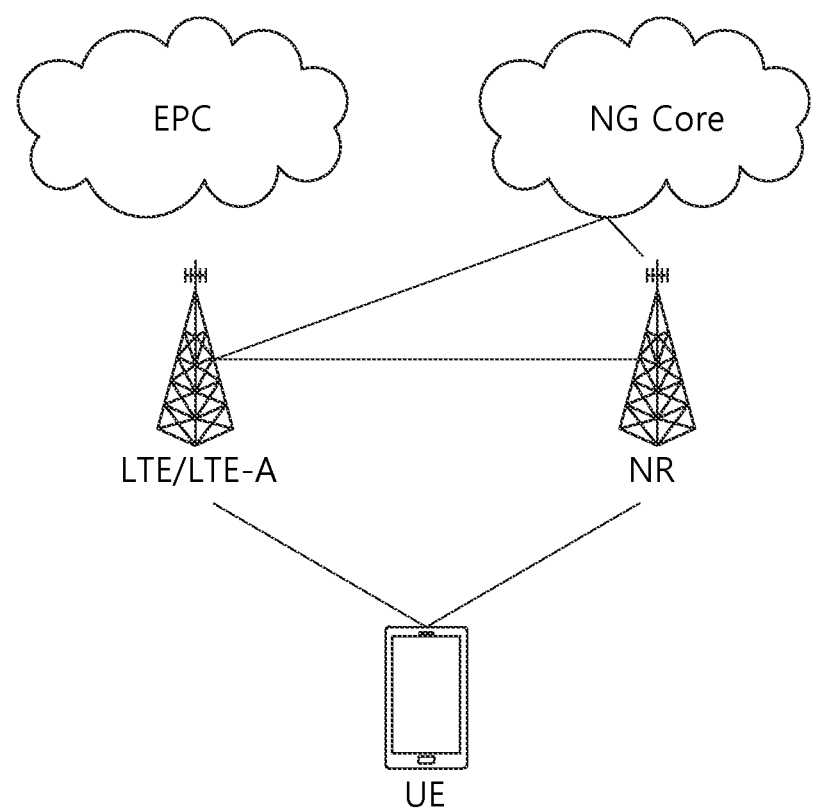
Figure 2C:
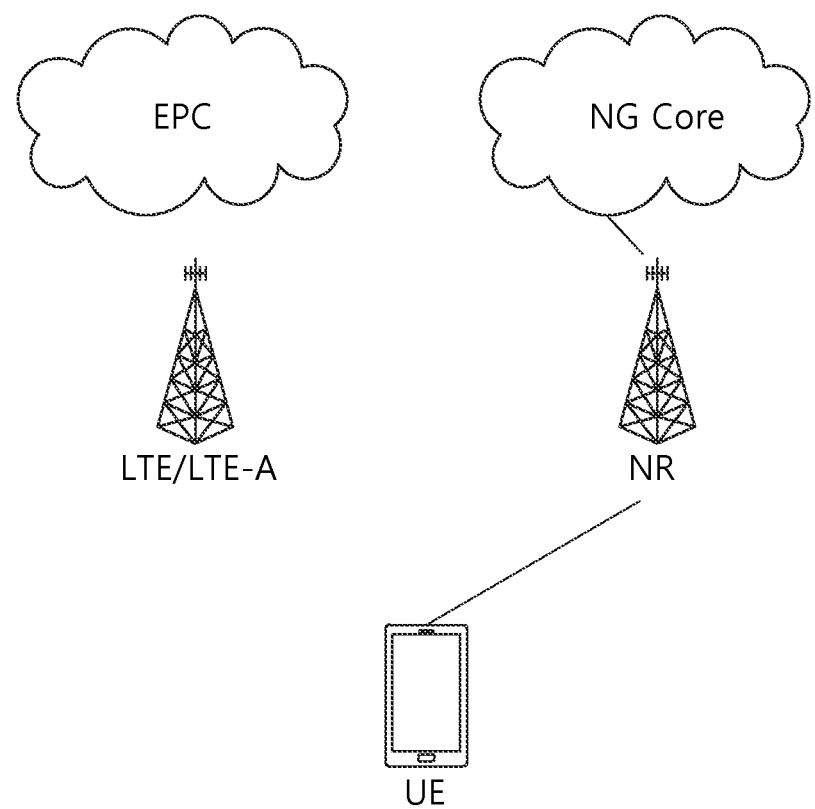

FIGS. 2a to 2c are Exemplary Diagrams Illustrating Exemplary Architectures for Services of the Next Generation Mobile Communication.

Referring to FIG. 2a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2b, unlike FIG. 2a, the LTE/LTE-A based cell is connected to a core network for the 5G mobile communication, that is, a next generation (NG) core network.

The service scheme based on the architecture as illustrated in FIGS. 2a and 2B is called non-standalone (NSA).

Referring to FIG. 2c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 3:
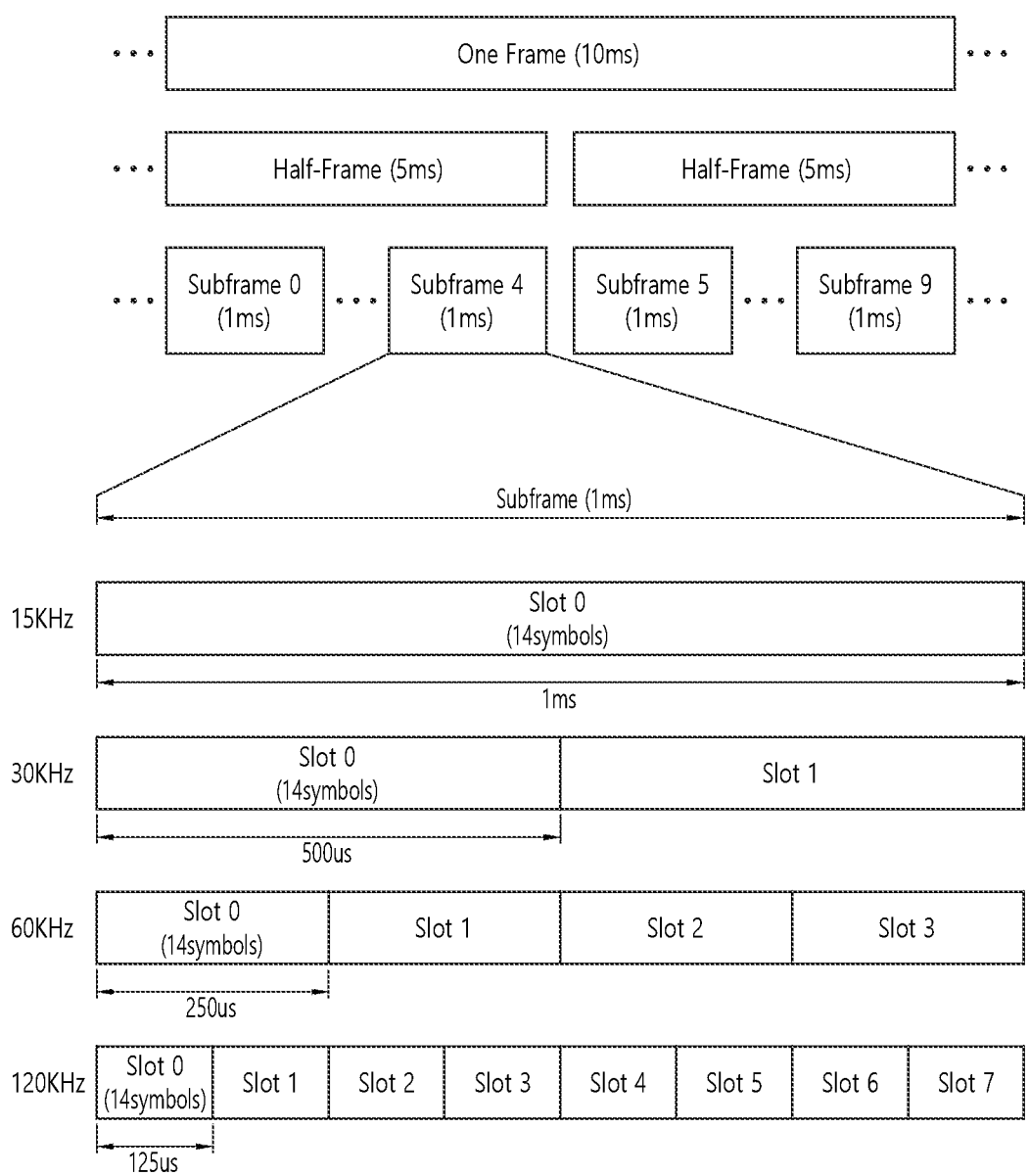
FIG. 3 illustrates an example of a structure of NR radio frame.

FIG. 3 Illustrates an Example of a Structure of NR Radio Frame.

In the NR, the uplink and downlink transmission are based on radio frames. The radio frame has a length of 10 ms and may be defined as two 5 ms half-frames (HFs). The half-frame may be defined as five 1 ms subframes (SFs). The subframe is divided into one or more slots, and the number of slots in the subframe depends on the subcarrier spacing (SCS). Each slot includes 12 or 14 OFDM (A) symbols according to the cyclic prefix (CP). When the normal CP is used, each slot includes 14 symbols. When the extended CP is used, each slot includes 12 symbols. Here, the symbol may include an OFDM symbol (or CP-OFDM symbol) and an SC-FDMA symbol (or DFT-s-OFDM symbol).

FIG. 4 Shows an Example of Subframe Type in NR.

A transmission time interval (TTI) shown in FIG. 4 may be called a subframe or slot for NR (or new RAT). The subframe (or slot) in FIG. 4 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

Table 1 exemplarily shows that when the normal CP is used, the number of symbols per slot, the number of slots per frame, and the number of slots per subframe vary according to the SCS.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: The number of symbols in slot
*$N^{frame, u}_{slot}$: The number of slots in frame
*$N^{subframe, u}_{slot}$: The number of slots in subframe Table 2 exemplarily shows that when the extended CP is used, the number of symbols per slot, the number of slots per frame, and the number of slots per subframe vary according to the SCS.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, OFDM (A) numerology (for example, SCS, CP length, and the like) may be set differently between a plurality of cells merged into one terminal. Accordingly, a (absolute time) section of a time resource (for example, SF, slot, or TTI) (commonly referred to as a time unit (TU) for convenience) composed of the same number of symbols may be set differently between the merged cells.

Meanwhile, in the next-generation mobile communication, each symbol may be used for downlink or uplink, as shown in an example of the following table. In the following table, uplink is indicated by U, and downlink is indicated by D. In the following table, X indicates a symbol that can be flexibly used for uplink or downlink.

TABLE 3

| For-mat | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | U | U | U | U | U | U | U |
| 46 | D | D | D | D | D | X | D | D | D | D | D | D | D | X |
| 47 | D | D | D | D | X | D | D | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | U | U | U | U | X | X | U | U | U | U | U | U |
| 53 | X | X | X | U | U | U | X | X | X | U | U | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmWave).

TABLE 4

| Frequency Range Designation | Corresponding Frequency Range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 5. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 5

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Table 6 shows examples of operating bands on FR1. Operating bands shown in Table 6 is a reframing operating band that is transitioned from an operating band of LTE/LTE-A. This operating band may be referred to as FR1 operating band.

TABLE 6

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz 4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 7 shows examples of operating bands on FR2. The following table shows operating bands defined on a high frequency. This operating band is referred to as FR2 operating band.

TABLE 7

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

In NR, E-UTRA (Evolved UMTS (Universal Mobile Telecommunications System) Terrestrial Radio Access) operating bands may also be used for communication. E-UTRA operating bands may mean operating bands of LTE.

The following table is an example of E-UTRA operating bands.

TABLE 8

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30[15] | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

Carrier aggregation may be classified into a continuous carrier aggregation in which aggregated carriers are continuous and a non-contiguous carrier aggregation in which aggregated carriers are separated from each other. In the following, carrier aggregation simply should be understood to include both the case where the component carrier (CC) is continuous and the case where it is discontinuous. The number of CCs aggregated between the downlink and the uplink may be set differently. A case in which the number of downlink CCs and the number of uplink CCs are the same may be referred to as symmetric aggregation, and a case in which the number of downlink CCs are different may be referred to as asymmetric aggregation.

On the other hand, carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 5A:
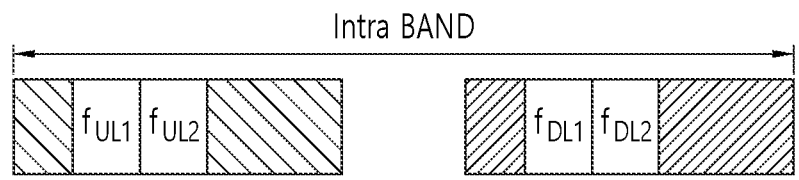
FIG. 5a illustrates a concept view of an example of intra-band contiguous CA.
Figure 5B:
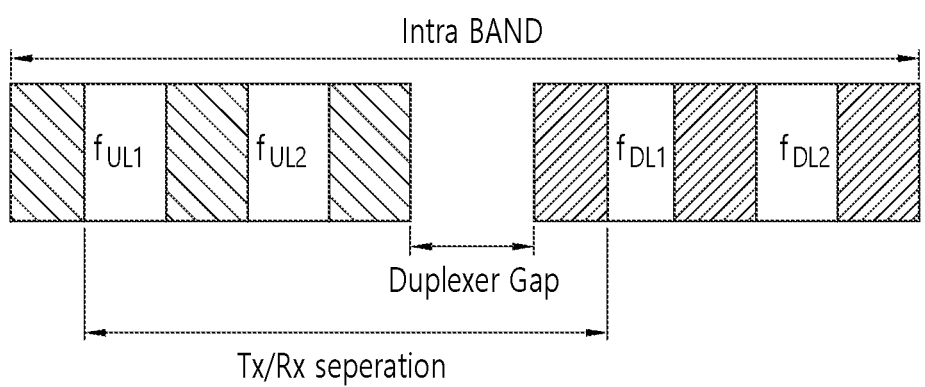
FIG. 5b illustrates a concept view of an example of intra-band non-contiguous CA.

FIG. 5a Illustrates a Concept View of an Example of Intra-Band Contiguous CA. FIG. 5b Illustrates a Concept View of an Example of Intra-Band Non-Contiguous CA.

LTE-advanced adds various schemes including uplink MIMO and carrier aggregation in order to realize high-speed wireless transmission. The CA may be split into the intra-band contiguous CA shown in FIG. 5a and the intra-band non-contiguous CA shown in FIG. 5b.

Figure 6A:
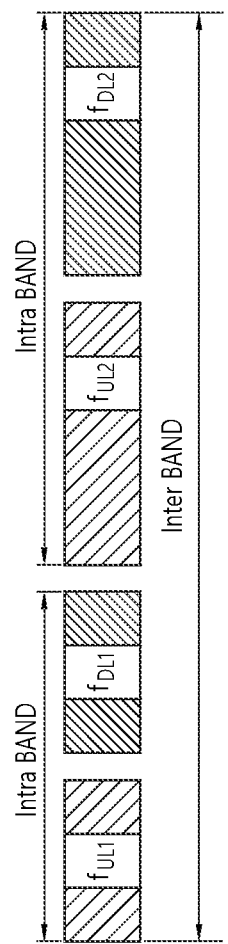
FIG. 6a illustrates a concept view of an example of a combination of a lower frequency band and a higher frequency band for inter-band CA.
Figure 6B:
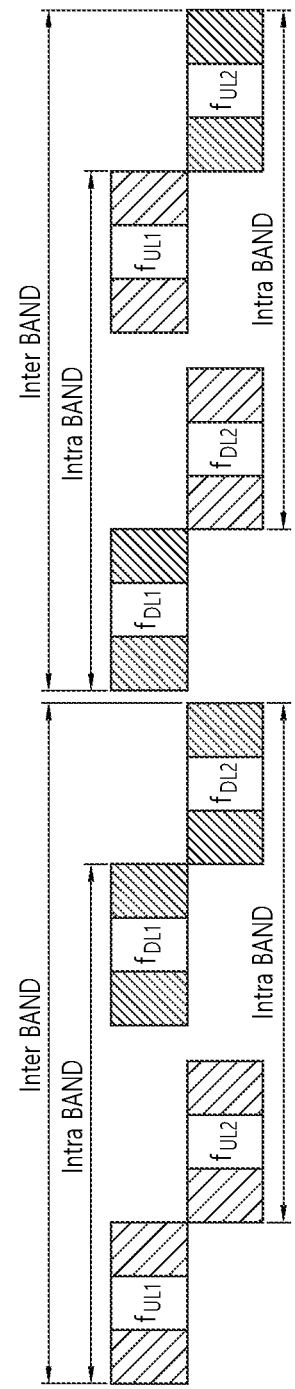
FIG. 6b illustrates a concept view of an example of a combination of similar frequency bands for inter-band CA.

FIG. 6a Illustrates a Concept View of an Example of a Combination of a Lower Frequency Band and a Higher Frequency Band for Inter-Band CA. FIG. 6b Illustrates a Concept View of an Example of a Combination of Similar Frequency Bands for Inter-Band CA.

The inter-band carrier aggregation may be separated into inter-band CA between carriers of a low band and a high band having different RF characteristics of inter-band CA as shown in FIG. 6a and inter-band CA of similar frequencies that may use a common RF terminal per component carrier due to similar RF (radio frequency) characteristics as shown in FIG. 6b.

The following table is an example of Transmission bandwidth configuration $N_{RB}$ in E-UTRA.

TABLE 9

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

In Table 9, $N_{RB}$ may mean Transmission bandwidth configuration, expressed in units of resource blocks.

The following table is an example of CA bandwidth classes and corresponding nominal guard band $BW_{GB}$.

TABLE 10

| CA Bandwidth Class | Aggregated Transmission Bandwidth Configuration | Number of contiguous CC | Nominal Guard Band $BW_{GB}$ |
|---|---|---|---|
| A | $N_{RB, agg} \leq 100$ | 1 | $a_1 \, BW_{Channel(1)}$-0.5 $\Delta f_1$ (NOTE 2) |
| B | $25 < N_{RB, agg} \leq 100$ | 2 | 0.05 max($BW_{Channel(1)}$, $BW_{Channel(2)}$)-0.5 $\Delta f_1$ |
| C | $100 < N_{RB, agg} \leq 200$ | 2 | 0.05 max($BW_{Channel(1)}$, $BW_{Channel(2)}$)-0.5 $\Delta f_1$ |
| D | $200 < N_{RB, agg} \leq 300$ | 3 | 0.05 max($BW_{Channel(1)}$, $BW_{Channel(2)}$, $BW_{Channel(3)}$)-0.5 $\Delta f_1$ |
| E | $300 < N_{RB, agg} \leq 400$ | 4 | 0.05 max($BW_{Channel(1)}$, $BW_{Channel(2)}$, $BW_{Channel(3)}$, $BW_{Channel(4)}$)-0.5 $\Delta f_1$ |
| F | $400 < N_{RB, agg} \leq 500$ | 5 | 0.05 max($BW_{Channel(1)}$, $BW_{Channel(2)}$, $BW_{Channel(3)}$, $BW_{Channel(4)}$, $BW_{Channel(5)}$)-0.5 $\Delta f_1$ |
| I | $700 < N_{RB, agg} \leq 800$ | 8 | NOTE 3 |

NOTE 1:
$BW_{Channel(j)}$, j = 1, 2, 3, 4 is the channel bandwidth of an E-UTRA component carrier according to Table 9 and $\Delta f_1$ = $\Delta f$ for the downlink with $\Delta f$ the subcarrier spacing while $\Delta f_1$ = 0 for the uplink.
NOTE 2:
$a_1$ = 0.16/1.4 for $BW_{Channel(1)}$ = 1.4 MHz whereas $a_1$ = 0.05 for all other channel bandwidths.
NOTE 3:
Applicable for later releases.

In Table 10, $BW_{GB}$ may mean nominal guard band. The nominal guard band may mean a virtual guard band to facilitate transmitter (or receiver) filtering above/below edge CC(Component Carrier)s. $N_{RB,agg}$ may mean the number of aggregated RBs within a fully allocated Aggregated Channel bandwidth.

Figure 7:
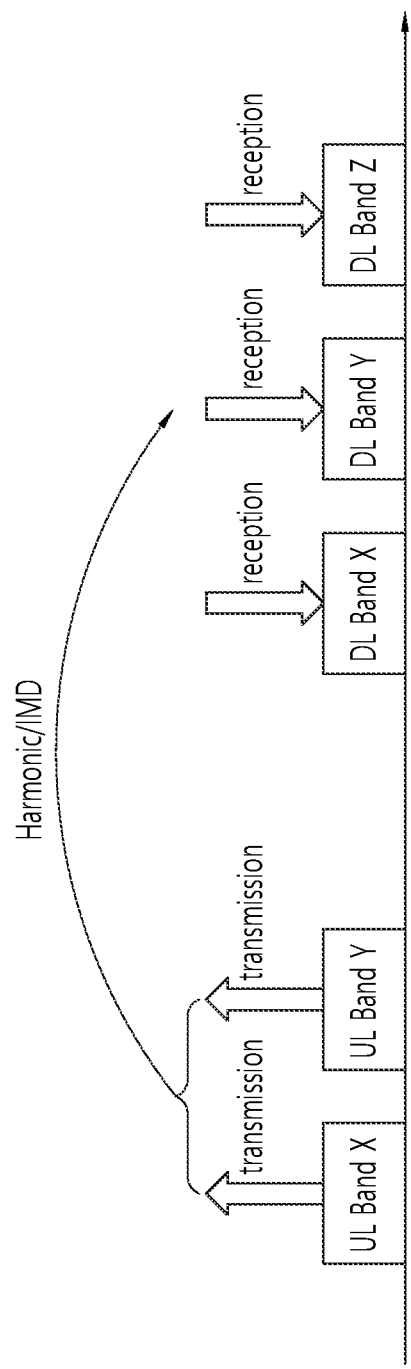
FIG. 7 illustrates an example of situation in which an uplink signal transmitted via an uplink operating band affects reception of a downlink signal on via downlink operating band.

FIG. 7 Illustrates an Example of Situation in which an Uplink Signal Transmitted Via an Uplink Operating Band Affects Reception of a Downlink Signal on Via Downlink Operating Band.

In FIG. 7, Intermodulation Distortion (IMD) may mean amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Referring to FIG. 7, an example in which a CA is configured with a terminal is shown. For example, the terminal may perform communication by using the CA based on three downlink operating bands (DL Band X, Y, Z) and two uplink operating bands (DL Band X, Y).

As shown in FIG. 7, in a situation in which three downlink operating bands are configured by the CA and two uplink operating bands are configured by the CA, the terminal may transmit an uplink signal through two uplink operating bands. In this case, a harmonics component and an intermodulation distortion (IMD) component occurring based on the frequency band of the uplink signal may fall into its own downlink band. That is, in the example of FIG. 7, when the terminal transmits the uplink signal, the harmonics component and the intermodulation distortion (IMD) component may occur, which may affect the downlink band of the terminal itself.

The terminal should be configured to satisfy a reference sensitivity power level (REF SENS) which is the minimum average power for each antenna port of the terminal when receiving the downlink signal.

When the harmonics component and/or IMD component occur as shown in the example of FIG. 7, there is a possibility that the REF SENS for the downlink signal may not be satisfied due to the uplink signal transmitted by the terminal itself.

For example, the REF SENS may be set such that the downlink signal throughput of the terminal is 95% or more of the maximum throughput of the reference measurement channel. When the harmonics component and/or IMD component occur, there is a possibility that the downlink signal throughput is reduced to 95% or less of the maximum throughput.

Therefore, when the harmonics component and/or IMD component occur, whether the harmonics component and the IMD component of the terminal occur may be determined, and the maximum sensitivity degradation (MSD) value is defined for the corresponding frequency band, so relaxation for REFSENS in the reception band related to its own transmission signal may be allowed. Here, the MSD may mean the maximum allowed reduction of the REF SENS. When the MSD is defined for a specific operating band of the terminal, which configured with the CA, the REFSENS of the corresponding operating band may be relaxed by the amount of the defined MSD.

Various combinations of downlink operating bands and uplink operating bands may be used for the CA. For example, for LTE-A inter-band CA, combinations of n (n=3, 4, 5) downlink operating bands and two uplink operating bands may be used.

Hereinafter, the LTE-A inter-band CA using combinations of n (n=3, 4, 5) downlink operating bands and two uplink operating bands may also be referred to as n bands (n=3, 4, 5) DL/2 bands UL, or n DL/2 UL inter-band CA.

Conventionally, the impact of harmonics and/or IMD on some combinations in the CA case based on n bands DL/2 bands UL combinations has not been analyzed and the MSD values have not been discussed. For example, the impact of the harmonics and/or IMD for a combination of a CA_2A-13A-66A-66B downlink band and a CA_13A-66A uplink band, and a combination of a CA_2A-48A-66A downlink band and a CA_48A-66A uplink band of Table 11, which will be described later, among 3 bands DL/2 band UL combinations is not analyzed, and the MSD values have not been discussed.

In the CA case based on n bands DL/2 bands UL combinations, the terminal may perform dual uplink transmission through two uplink operating bands. In this case, the MSD value for analyzing the impact of the harmonics and/or IMD occurring in the downlink operating band other than the uplink operating band used for the dual uplink transmission among the n downlink operating bands and relaxing the REFSENS specification needs to be proposed.

Hereinafter, the impact of the harmonics and/or IMD in the CA case based on the n bands DL/2 bands UL combinations is analyzed. In addition, the MSD value for relaxing the RESENS specification based on the analyzed results is proposed.

For example, self-interference (for example, interference due to the harmonics and/or IMD) occurring in the terminal, which configured wthLTE-A inter-band CA (3 bands DL/2 bands UL), may be analyzed. In addition, the MSD value may be set based on the analyzed self-interference, and a reference sensitivity specification, which is relaxed due to the MSD, may be defined.

In other words, in the present disclosure, for the terminal, which configured with the 3 DL/2 Uplink LTE-A inter-band CA to perform communication, the impact of the self-interference (harmonics and/or IMD) occurring in another downlink band other than the uplink transmission bands may be analyzed. In addition, in the present disclosure, the maximum sensitivity degradation (MSD) value may be proposed in consideration of a radio frequency (RF) structure in a combination of bands in which the impact of self-interference is analyzed. The proposed MSD makes it possible to make exceptions to the reference sensitivity of the band (for example, to relax the REFSENS based on the MSD value). The reference sensitivity to which the exceptions are applied during the terminal test may be applied to the terminal, and the terminal may pass the terminal test based on the applied reference sensitivity As described above, for the combination of the UL operating band and the DL operating band having the self-interference problem, the MSD needs to be determined.

Among the 3 bands DL/2 bands UL combinations, for the 3 bands DL/2 bands UL combinations (that is, 3 bands DL/2 bands UL combination CA operating band combinations), the MSD for one downlink band (one of the three downlink bands) affected by the harmonic and/or IMD occurring during the dual uplink transmission based on two UL operating bands may be provided below.

For 4 bands DL/2 band UL CA band combinations and 5 bands DL/2 bands UL CA band combinations, no additional analysis is needed for harmonics and/or IMD in DL bands (4th and 5th bands) corresponding to the same E-UTRA operating band as the UL band. This is because all self-defense problems are addressed by a combination of the 2 bands DL/2 bands UL and the 3 bands DL/2 bands UL CA. For example, the 5 bands DL/2 bands UL CA combination includes a 3 bands DL/2 bands UL CA combination and a 2 bands DL/2 bands UL CA combination. Therefore, for the 5 bands DL/2 bands UL CA combination, the analysis results of the 3 bands DL/2 bands UL CA combination and the 2 bands DL/2 bands UL CA combination can be reused, and as a result, no additional analysis is needed for the/2 bands UL CA combination.

Table 11 below shows an example of the 3 bands DL/2 bands UL CA band combination associated with the self-interference problem.

TABLE 11

| Downlink CA configuration | Uplink CA configuration | Harmonic relation to $3^{rd}$ band without uplink | Intermodulation to $3^{rd}$ band without uplink | Interference due to small frequency separation | MSD (Maximum Sensitivity Degradation) |
|---|---|---|---|---|---|
| CA_3A-11A-18A | CA_3A-11A | — | $5^{th}$ IMD | — | 4.9 dB |
| CA_3A-11A-26A | CA_3A-11A | — | $5^{th}$ IMD | — | 4.9 dB |
| CA_1A-3A-42C | CA_1A-42C | — | — | — | N/A |
| CA_1A-3A-42C | CA_3A-42C | — | — | — | N/A |
| CA_2A-4A-13A | CA_2A-13A | — | $4^{th}$ IMD | — | 7.6 dB |
|  | CA_4A-13A | — | $4^{th}$ IMD | — | 6.2 dB |
| CA_2A-2A-4A-5A | CA_2A-5A | — | $4^{th}$ IMD | — | 7.6 dB |
|  | CA_4A-5A | — | $2^{nd}$, $5^{th}$ IMDs | — | $2^{nd}$ and $5^{th}$ IMD problems were already covered before. |
| CA_2A-2A-5A-66A-66A | CA_2A-5A | — | $4^{th}$ IMD | — | 7.2 dB |
| CA_2A-5B-66A-66A | CA_2A-5A | — | $4^{th}$ IMD | — | 7.2 dB |
|  | CA_5A-66A | — | $2^{nd}$, $5^{th}$ IMDs | — | $2^{nd}$ and $5^{th}$ IMD problems were already covered before. |
| CA_2A-5A-46D | CA_2A-5A | $3^{rd}$ Harmonic | $4^{th}$, $5^{th}$ IMDs | — | No need to study for $3^{rd}$ harmonic impact from B2 to B46 since B46 is specified as reference measurement exclusion region. 2.4 dB for IMD4 2.7 dB for IMD5 |
| CA_5A-46D-66A | CA_5A_46A | — | $5^{th}$ IMD | — | 0.3 dB |
|  | CA_5A_66A | $3^{rd}$ Harmonic | $4^{th}$, $5^{th}$ IMDs | — | No need to study for $3^{rd}$ harmonic impact from B66 to B46 since B46 is specified as reference measurement exclusion region. 2.5 dB for IMD4 0 dB for IMD5 |
| CA_2A-13A-66A-66B | CA_2A-13A | — | $4^{th}$ IMD | — | 7.2 dB |
|  | CA_13A-66A | — | $4^{th}$ IMD | — | not defined |
| CA_2A-13A-48A-48C | CA_2A-13A | $2^{nd}$ Harmonic at high frequency band edge | — | — | $2^{nd}$ harmonic impact from B2 to B48 was covered before. |
| CA_13A-46D-66A | CA_13A-66A | $3^{rd}$ Harmonic | $4^{th}$, $5^{th}$ IMDs | — | No need to study for $3^{rd}$ harmonic impact from B66 to B46 since B46 is specified as reference measurement exclusion region. 7.2 dB for IMD4 0 dB for IMD5 |
| CA_2A-13A-46D | CA_2A-13A | $3^{rd}$ Harmonic | $4^{th}$ IMD | — | No need to study for $3^{rd}$ harmonic impact from B2 to B46 since B46 is specified as reference measurement exclusion region. 2.5 dB |
| CA_1A-3A-38A | CA_1A-3A | — | $3^{rd}$ IMD into B1 | — | $3^{rd}$ IMD problem was already covered before. |
| CA_2A-12A-66A | CA_2A-12A | $3^{rd}$ Harmonic impact from B12 to B66 | — | — | $3^{rd}$ harmonic impact from B12 to B66 was covered before. |
|  | CA_2A-66A | — | $3^{rd}$ IMD into B2 $5^{th}$ IMD into B66 | — | $3^{rd}$ and 5th IMD problems were already covered before. |
|  | CA_12A-66A | $3^{rd}$ Harmonic impact from B12 to B66 | $4^{th}$ IMD into B66 $4^{th}$ IMD into B2 | — | $3^{rd}$ harmonic impact from B12 to B66 was covered before. For 4th IMD into B66, no impact when considering fixed Tx-Rx band separation of 400 MHz in Band 66. Need to study for the side-lobe impact of $4^{th}$ IMD product |

TABLE 11-continued

| Downlink CA configuration | Uplink CA configuration | Harmonic relation to $3^{rd}$ band without uplink | Intermodulation to $3^{rd}$ band without uplink | Interference due to small frequency separation | MSD (Maximum Sensitivity Degradation) |
|---|---|---|---|---|---|
| CA_1A-3A-42D | CA_1A-3A | $2^{nd}$ Harmonic impact from B3 to B42 | $3^{rd}$ IMD into B1 $4^{th}$ IMD into B42 | — | $2^{nd}$ harmonic impact from B3 to B42 was covered before. $3^{rd}$ IMD problem was already covered before. $4^{th}$ IMD problem was already covered before. |
| CA_2A-48A-66A | CA_48A-66A | — | $2^{nd}$ and $5^{th}$ IMDs | — | not defined |

In Table 11, 3rd band without uplink means a downlink operating band that does not overlap two uplink operating bands among three downlink operating bands used for the CA.

For example, in the CA_2A-13A-66A-66B downlink band and CA_13A-66A uplink band combination, the 3rd band without uplink means downlink operating band 2. As another example, in the CA_2A-48A-66A-66B downlink band and CA_13A-66A uplink band combination, the 3rd band without uplink means the downlink operating band 2.

Here, the CA_2A-13A-66A-66B downlink band may mean that downlink operating bands 2, 13, and 66 are used, and the CA_13A-66A uplink band may mean that uplink operating bands 13 and 66 are used.

The CA_2A-48A-66A downlink band may mean that downlink operating bands 2, 13, 48, and 66 are used, and the CA_48A-66A uplink band may mean that uplink operating bands 48 and 66 are used.

Alphabets (A, B, C, D, and the like) after the number refer to a bandwidth class described in the example of Table 10. For example, the CA_2A-13A-66A-66B downlink band means that CC with bandwidth class A and/or B in downlink operating band 66, CC with bandwidth class A and CC with bandwidth class B are used in the downlink operating band 2, and the CC with the bandwidth class A is used in the downlink operating band 2, and the CC with the bandwidth class A is used in the downing operating band 13.

Referring to Table 11, the self-interference problem of the combination of the CA_2A-13A-66A-66B downlink band and the CA_13A-66A uplink band, and the combination of the CA_2A-48A-66A downlink band and the CA_48A-66A uplink band is not analyzed. That is, the MSD values for the combination of the CA_2A-13A-66A-66B downlink band and the CA_13A-66A uplink band and the combination of the CA_2A-48A-66A downlink band and the CA_48A-66A uplink band are not defined.

Hereinafter, the 4th IMD for the downlink operating band 2 will be analyzed for the combination of the CA_2A-13A-66A-66B downlink band and the CA_13A-66A uplink band. The 2nd IMD and 5th IMD for the downlink operating band 2 will be analyzed for the combination of CA_2A-48A-66A downlink band and the CA_48A-66A uplink band. Based on the analysis results, the MSD values for the combination of the CA_2A-13A-66A-66B downlink band and the CA_13A-66A uplink band and the combination of the CA_2A-48A-66A downlink band and the CA_48A-66A uplink band will be determined.

Figure 8:
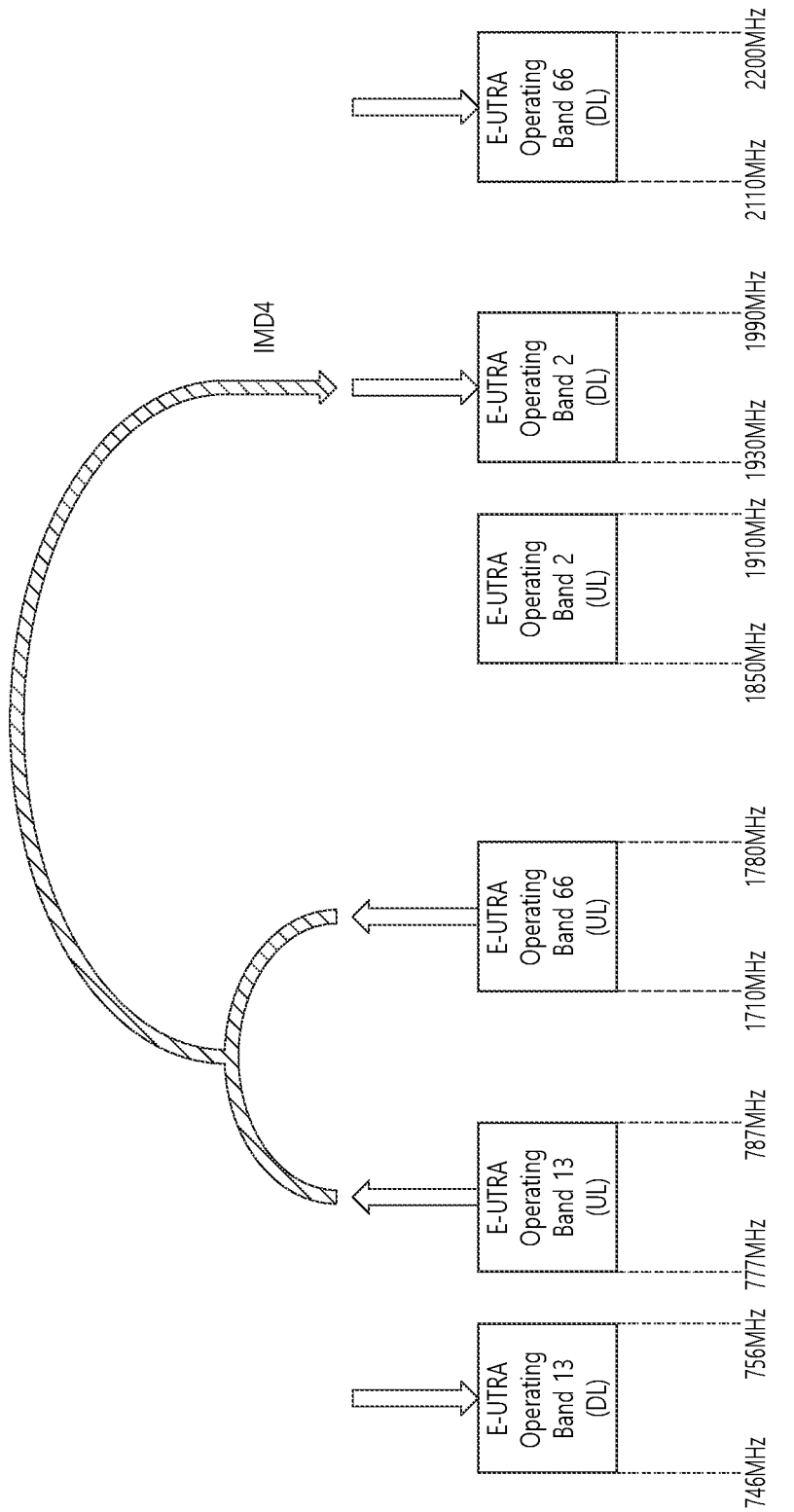
FIG. 8 illustrates an example of IMD 4 for CA with downlink bands 2, 13, 66 and uplink bands 13, 66.

FIG. 8 Illustrates an Example of IMD 4 for CA with Downlink Bands 2, 13, 66 and Uplink Bands 13, 66.

FIG. 8 shows an example of the IMD 4 affecting the downlink band 2 in the combination of the CA_2A-13A-66A-66B downlink band and CA_13A-66A uplink band.

Referring to FIG. 8, a 4th order IMD (IMD 4) component of an uplink signal transmitted in the uplink band 13 and an uplink signal transmitted in the uplink band 66 may fall into a frequency range of the downlink band 2.

The worst case where the impact of the IMD 4 within the frequency range of the downlink band 2 is greatest is the case where a center frequency of the uplink band 13 is 782 MHz, a center frequency of the uplink operating band 66 is 1762 MHz, and a center frequency of the downlink operating band 2 is 1960 MHz. In this case, since 1762*2-782*2=1960, the frequency of the IMD4 component of the uplink bands 13 and 66 coincides with the center frequency of the downlink band 2.

Figure 9:
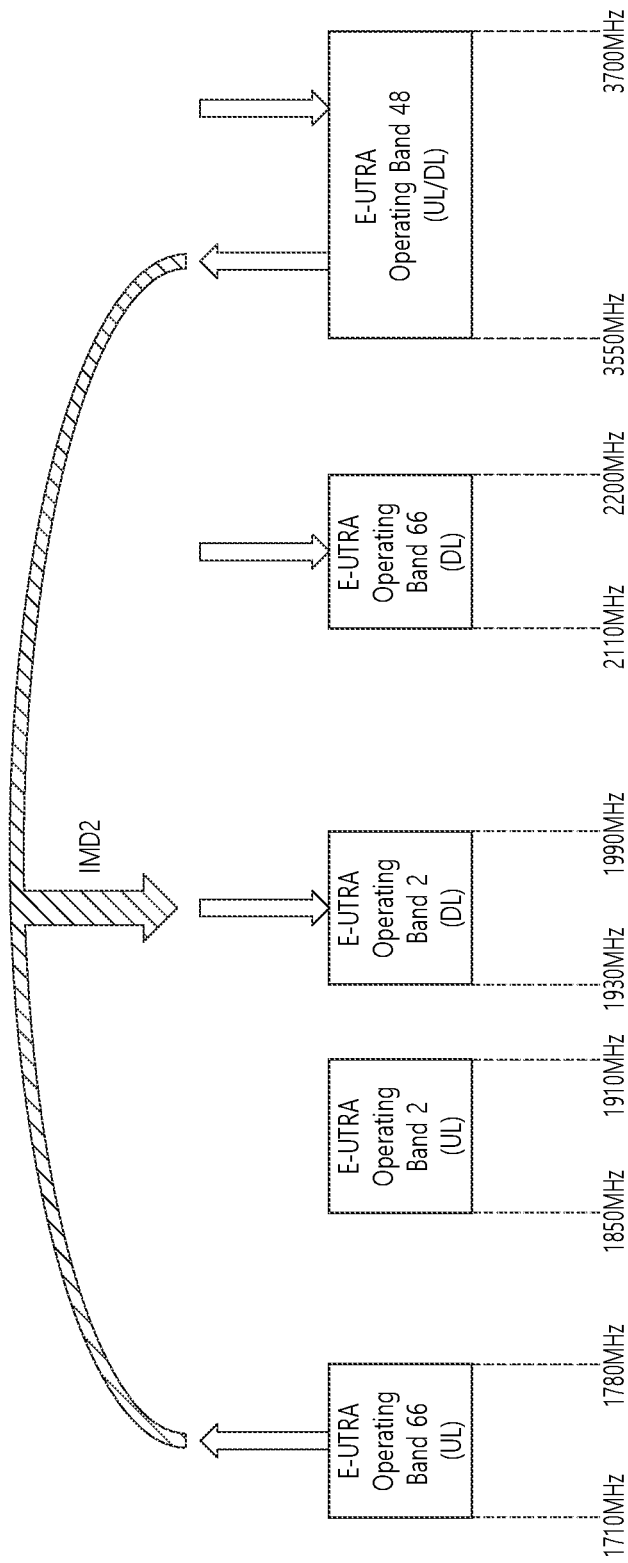
FIG. 9 illustrates an example of IMD 2 for CA with downlink bands 2, 48, 66 and uplink bands 48, 66.

FIG. 9 Illustrates an Example of IMD 2 for CA with Downlink Bands 2, 48, 66 and Uplink Bands 48, 66.

FIG. 9 shows an example of the IMD 2 affecting the downlink band 2 in the combination of the CA_2A-48A-66A downlink band and the CA_48A-66A uplink band. Although only an example of the IMD 4 is shown in FIG. 9, the IMD 5 affecting the downlink band 2 may also be generated in the combination of the CA_2A-48A-66A downlink band and the CA_48A-66A uplink band.

Referring to FIG. 9, a 2nd order IMD (IMD 2) component of an uplink signal transmitted in the uplink band 66 and an uplink signal transmitted in the uplink band 48 may fall into a frequency range of the downlink band 2.

The worst case where the impact of the IMD 2 within the frequency range of the downlink band 2 is greatest is the case where a center frequency of the uplink band 66 is 1735 MHz, a center frequency of the uplink operating band 66 is 3695 MHz, and a center frequency of the downlink operating band 2 is 1960 MHz. In this case, since 3695-1735=1960, the frequency of the IMD4 component of the uplink bands 48 and 66 coincides with the center frequency of the downlink band 2.

Table 12 shows an example of RF component parameters of the UE used to analyze the IMD and determine the MSD value.

TABLE 12

| UE ref. architecture | Cascaded Diplexer Architecture All CA band combos | | | |
|---|---|---|---|---|
| Component | IP2 (dBm) | IP3 (dBm) | IP4 (dBm) | IP5 (dBm) |
| Ant. Switch | 112 | 68 | 55 | 55 |
| Diplexer | 115 | 87 | 55 | 55 |
| Duplexer | 100 | 75 | 55 | 53 |
| Quadplexer | 110 | 72 | 55 | 52 |
| PA Forward | 28.0 | 32 | 30 | 28 |
| PA Reversed | 40 | 30.5 | 30 | 30 |
| LNA | 10 | 0 | 0 | −10 |

Here, IP n may mean an nth order intercept point. For example, IP4 is a 4th order intercept point. LNA may mean a low noise amplifier. PA may mean a power amplifier.

By using simulation based on UE reference architecture and the RF component parameters in Table 12, the IMD problem and MSD for the downlink operating band 2 are analyzed in the combination of the CA_2A-13A-66A-66B downlink band and the CA_13A-66A uplink band, and the combination of the CA_2A-48A-66A downlink band and CA_48A-66A uplink band.

Table 13 shows an example of an isolation level of the RF component of the UE used to analyze the IMD and determine the MSD value.

TABLE 13

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Diplexer | 25 | High/low band isolation |
| Quadplexer | 15 | Adjacent Tx-Rx atten level |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Table 13 shows an example of isolation parameters of UE RF front-end component parameters. Based on simulation based on the isolation parameters in Table 13, the IMD problem and MSD for the downlink operating band 2 are analyzed in the combination of the CA_2A-13A-66A-66B downlink band and the CA_13A-66A uplink band, and the combination of the CA_2A-48A-66A downlink band and the CA_48A-66A uplink band.

Based on simulation based on the isolation parameters in Table 13 and UE reference architecture and the RF component parameters in Table 12, the IMD problem and MSD for the downlink operating band 2 are analyzed in the combination of the CA_2A-13A-66A-66B downlink band and the CA_13A-66A uplink band, and the combination of the CA_2A-48A-66A downlink band and the CA_48A-66A uplink band.

Figure 10:
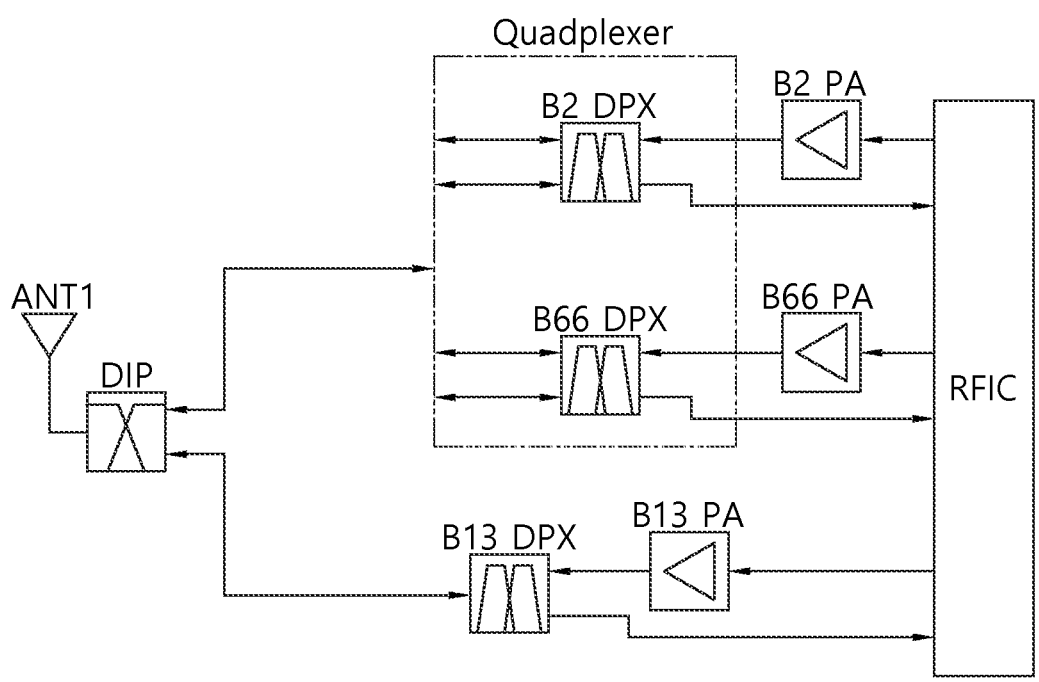
FIG. 10 illustrates an example of terminal's RF structure used for analyzing IMD and MSD for CA with downlink bands 2, 13, 66 and uplink bands 13, 66.
Figure 11:
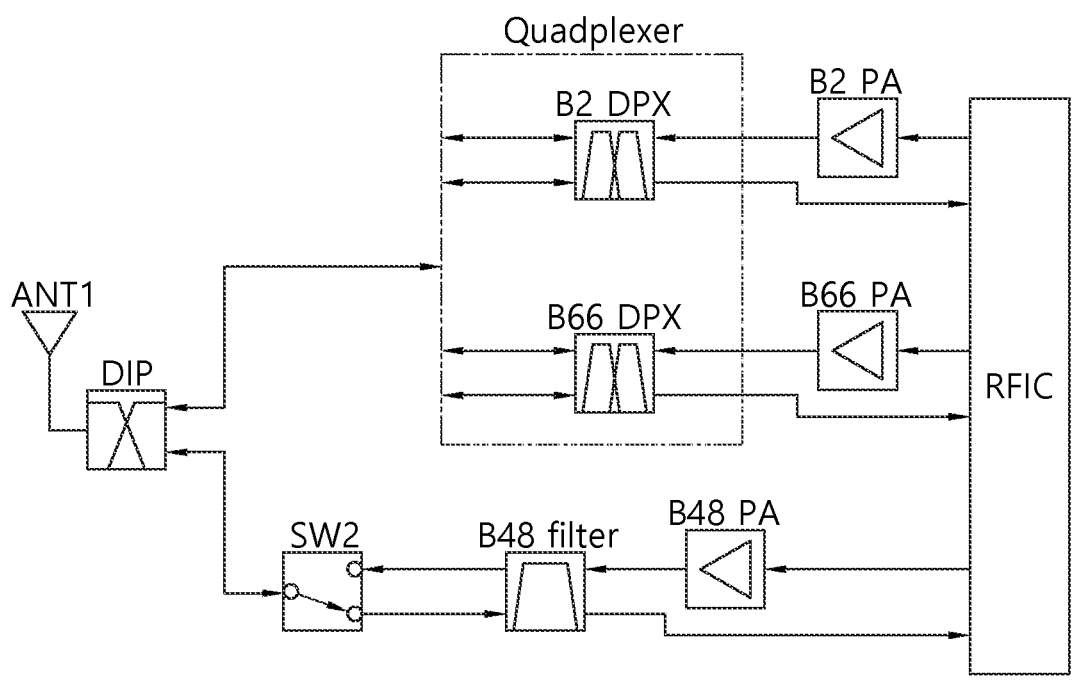
FIG. 11 illustrates an example of terminal's RF structure used for analyzing IMD and MSD for CA with downlink bands 2, 48, 66 and uplink bands 48, 66.

Hereinafter, FIGS. 10 and 11 are examples of an RF structure of a terminal based on components to which parameters of Table 12 and Table 13 are applied. Based on the RF structure according to the example of FIG. 10, the IMD and the MSD of the combination of the CA_2A-13A-66A-66B downlink band and the CA_13A-66A uplink band may be analyzed. Based on the RF structure according to the example of FIG. 11, the IMD and the MSD of the combination of the CA_2A-48A-66A-66B downlink band and the CA_48A-66A uplink band may be analyzed. For reference, for the B48 filter of FIG. 11, the same parameters as the duplexers of Table 12 and Table 13 are applied.

For reference, in FIGS. 10 and 11, DPX may mean a duplexer, PA may mean a power amplifier, and DIP may mean a diplexer. In addition, RFIC may refer to a radio-frequency integrated circuit.

Examples of the RF structure illustrated in FIGS. 10 and 11 may be implemented by being included in a transceiver of a terminal. For example, the terminal may be a first wireless device 100 of FIG. 14. The transceiver(s) 106 of the first wireless device 100 may include the RF structure according to the examples of FIGS. 10 and 11.

FIG. 10 Illustrates an Example of Terminal's RF Structure Used for Analyzing IMD and MSD for CA with Downlink Bands 2, 13, 66 and Uplink Bands 13, 66.

When the uplink CA_13A_66A (bands 13 and 66) is paired with the downlink CA_2A-13A-66A-66B (bands 2, 13, and 66), the 4th order IMD component occurring by the uplink band 13 and the uplink band 66 may affect an Rx frequency band 2 (that is, downlink band 2) of the terminal itself. That is, 4th the order IMD may fall into downlink band 2.

Based on the example of the RF structure shown in FIG. 10, the 4th order IMD component affecting the downlink band 2 is analyzed, and the MSD value determined based on the analyzed IMD is 6.2 dB of Table 14 below.

FIG. 11 Illustrates an Example of Terminal's RF Structure Used for Analyzing IMD and MSD for CA with Downlink Bands 2, 48, 66 and Uplink Bands 48, 66.

When the uplink CA_48A_66A (bands 48 and 66) is paired with the downlink CA_2A-48A-66A (bands 2, 48, and 66), the 2nd order IMD and the 5th order IMD component occurring by the uplink band 48 and the uplink band 66 may affect the Rx frequency band 2 (that is, downlink band 2) of the terminal itself. That is, the 2nd order IMD and the 5th order IMD may fall into the downlink band 2.

Based on the example of the RF structure shown in FIG. 11, the 2nd order IMD and 5th order IMD components affecting the downlink band 2 is analyzed, and the MSD value determined based on the analyzed IMD is 28.3 dB and 0 dB of Table 14 below.

As described above, based on the simulation based on Tables 12, 13, and FIGS. 10 and 11, the IMD problem and MSD for the downlink operating band 2 are analyzed in the combination of the CA_2A-13A-66A-66B downlink band and the CA_13A-66A uplink band, and the combination of the CA_2A-48A-66A downlink band and the CA_48A-66A uplink band.

For example, for the worst case where the impact of IMD on downlink operating band 2 is the greatest in the two CA band combinations, simulations based on Tables 12, 13, 10, and 11 are performed. The IMD and MSD analyses are performed according to the simulations performed, and the MSD values determined according to the analysis results are shown in Table 14.

TABLE 14

E-UTRA Band/Channel bandwidth/$N_{RB}$/Duplex mode

| EUTRA CA DL Configuration | EUTRA CA UL Configuration | EUTRA band | UE $F_c$ (MHz) | UL BW (MHz) | UL $C_{LRB}$ | DL $F_c$ (MHz) | DL BW (MHz) | MSD (dB) | Duplex mode | Source of IMD |
|---|---|---|---|---|---|---|---|---|---|---|
| CA_2A-13A-66A-66B | CA_13A-66A | 2 | 1880 | 5 | 25 | 1960 | 5 | 6.2 | FDD | IMD4 |
| | | 13 | 782 | 5 | 25 | 751 | 5 | N/A | | |
| | | 66 | 1762 | 5 | 25 | 2162 | 5 | N/A | | |
| CA_2A-48A-66A | CA_48A-66A | 2 | 1880 | 5 | 25 | 1960 | 5 | 28.3 | FDD-TDD | IMD2 |
| | | 48 | 3695 | 5 | 25 | 3695 | 5 | N/A | | |
| | | 66 | 1735 | 5 | 25 | 2135 | 5 | N/A | | |

TABLE 14-continued

E-UTRA Band/Channel bandwidth/$N_{RB}$/Duplex mode

| EUTRA CA DL Configuration | EUTRA CA UL Configuration | EUTRA band | UE $F_c$ (MHz) | UL BW (MHz) | UL $C_{LRB}$ | DL $F_c$ (MHz) | DL BW (MHz) | MSD (dB) | Duplex mode | Source of IMD |
|---|---|---|---|---|---|---|---|---|---|---|
| | | 2 | 1895 | 5 | 25 | 1975 | 5 | 0 | | IMD5 |
| | | 48 | 3620 | 5 | 25 | 3620 | 5 | N/A | | |
| | | 66 | 1755 | 5 | 25 | 2155 | 5 | N/A | | |

Table 14 shows the MSD values applicable to the downlink operation band 2 in the CA_2A-13A-66A-66B downlink band and CA_13A-66A uplink band, and the combination of the CA_2A-48A-66A downlink band and the CA_48A-66A uplink band.

In Table 14, Fc means a center frequency. For example, UL Fc may mean the center frequency of the uplink operating band or the center frequency of the CC in the uplink operating band. CLRB may mean Transmission bandwidth which represents the length of a contiguous resource block allocation expressed in units of resource blocks.

When the terminal receives the downlink signal through the downlink operation band 2 in the combination of the CA_2A-13A-66A-66B downlink band and the CA_13A-66A uplink band, and the combination of the CA_2A-48A-66A downlink band and the CA_48A-66A uplink band, the MSD values in Table 14 can be applied to the reference sensitivity for the downlink operating band 2.

For example, the MSD values in Table 14 may be applied to minimum requirements that the terminal, which is configured with the CA based on the combination of the CA_2A-13A-66A-66B downlink band and the CA_13A-66A uplink band, should satisfy. That is, the MSD may be applied to the reference sensitivity of the downlink operating band 2. In other words, the reference sensitivity of the downlink operating band 2 may be relaxed by 6.2 dB.

As another example, the MSD values in Table 14 may be applied to the minimum requirements that the terminal, which is configured with the CA based on the combination of the CA_2A-48A-66A downlink band and the CA_48A-66A uplink band, should satisfy. That is, the MSD may be applied to the reference sensitivity of the downlink operating band 2. In other words, the reference sensitivity of the downlink operating band 2 may be relaxed by 28.3 dB.

Potential IMD problems can occur in the combination of the CA_2A-13A-66A-66B downlink and the CA_13A-66A uplink band, and the combination of the CA_2A-48A-66A downlink band and the CA_48A-66A uplink band, and therefore, it is suggested to apply the MSD values in Table 14 to the reference sensitivity of the downlink operating band 2.

The reception performance of the terminal can be tested by applying the MSD values in Table 14 to the reference sensitivity of the downlink operating band 2. In other words, the MSD values in Table 14 may be applied to the reference sensitivity of the downlink operating band 2 used when the reception performance of the terminal is tested. The transceiver (or receiver) of the terminal that passed the test satisfies the minimum requirements based on the reference sensitivity to which the MSD values in Table 14 apply.

Figure 14:
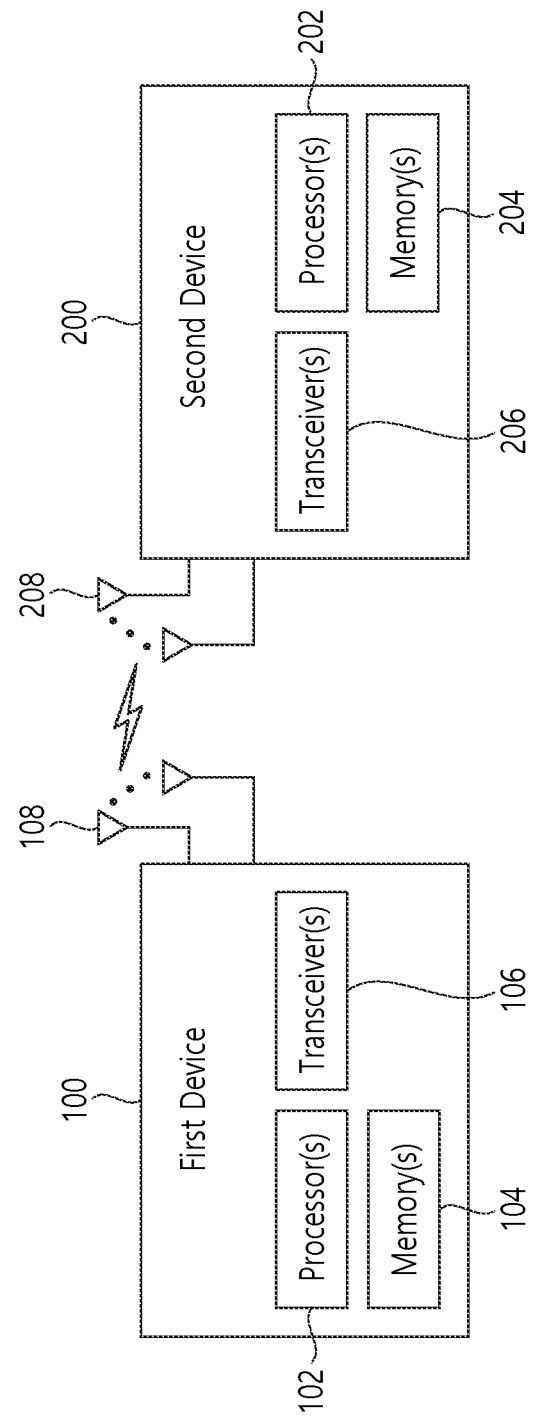
FIG. 14 illustrates an example of a wireless device that can be applied to the present specification.

The terminal (for example, first device 100 of FIG. 14) may include at least one transceiver (for example, transceiver(s) 106 of FIG. 14), at least one processor (for example, processor(s) 102 of FIG. 14). The terminal may also include at least one memory (for example, memory(s) 104 of FIG. 14. The transceiver may be configured to use a plurality of E-UTRA operating bands. For example, the CA may be configured such that the transceiver uses E-UTRA operating bands 2, 13, and 66 as a downlink band (for example, CA_2A-13A-66A-66B downlink band) and uses E-UTRA operating bands 13 and 66 as an uplink band (for example, CA_13A-66A uplink band). As another example, the transceiver is configured with the CA to use the E-UTRA operating bands 2, 13, and 66 as the downlink band (for example, CA_2A-48A-66A-66B downlink band) and use the E-UTRA operating bands 13 and 66 as the uplink band (for example, CA_48A-66A uplink band). At least one processor may be operably connectable to the transceiver. A processor may control the transceiver. At least one memory is operably connectable to at least one processor and at least one transceiver. The at least one memory may store instructions that may be executed by at least one processor. The at least one processor may execute instructions stored in at least one memory. The operations performed by the processor may be performed by executing instructions stored in the memory. At least one processor may control at least one transceiver to transmit an uplink signal through at least two (for example, bands 13 and 66 or bands 48 and 66) of the plurality of E-UTRA operating bands. At least one processor may control at least one transceiver to receive a downlink signal through at least three (for example, bands 2, 13, and 66 or bands 2, 48, and 66) of the plurality of E-UTRA operating bands. The combination of the at least two bands and the at least three bands may be a combination set for the CA. That is, the terminal may perform communication using the CA based on the combination of the at least two downlink operating bands and the at least three downlink operating bands. As in the example of Table 14, a preset MSD value may be applied to the reference sensitivity for the E-UTRA operating band 2.

Figure 12:
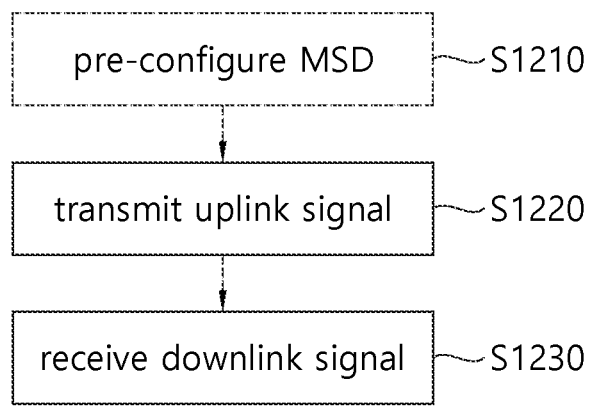
FIG. 12 is a flow chart showing an example of a procedure of a terminal according to the present disclosure.

Hereinafter, FIG. 12 illustrates an example of an operation performed by the terminal.

FIG. 12 is a Flow Chart Showing an Example of a Procedure of a Terminal According to the Present Disclosure.

Referring to FIG. 12, steps S1210 to S1230 are shown. Operations described below may be performed by the terminal (for example, the first device 100 of FIG. 14).

For reference, step S1210 may not always be performed when the terminal performs communication. For example, step S1210 may be performed only when the reception performance of the terminal is tested.

In the terminal performing the operation of FIG. 12, the CA based on the combination of three downlink bands and the two uplink bands may be configured. For example, the combination of three downlink bands and two uplink bands may be the combination of the CA_2A-13A-66A-66B downlink band and the CA_13A-66A uplink band or the combination of the CA_2A-48A-66A downlink band and the CA_48A-66A uplink band.

In step S1210, the terminal may preset the MSD value. For example, the terminal may preset the MSD values in Table 14. For example, for the combination of the CA_2A-13A-66A-66B downlink band and the CA_13A-66A uplink band, an MSD of 6.2 dB may be applied to the reference sensitivity of the downlink band 2. As another example, for the combination of the CA_2A-48A-66A-66B downlink band and the CA_13A-66A uplink band, an MSD of 28.3 dB or 0 dB may be applied to the reference sensitivity of the downlink band 2.

In step S1220, the terminal may transmit the uplink signal.

When the combination of the CA_2A-13A-66A-66B downlink band and the CA_13A-66A uplink band is configured in the terminal, the terminal may transmit the uplink signal through at least one of the uplink operating bands 13 and/or 66.

When the combination of the CA_2A-48A-66A downlink band and the CA_48A-66A uplink band is configured in the terminal, the terminal may transmit the uplink signal through at least one of the uplink operating bands 48 and/or 66.

In step S1230, the terminal may receive the downlink signal.

The terminal may receive the downlink signal based on the reference sensitivity of the downlink band 2, to which the MSD value is applied.

When the combination of the CA_2A-13A-66A-66B downlink band and the CA_13A-66A uplink band is configured in the terminal, the terminal may receive the downlink signal through at least one of the downlink operating bands 2, 13, and/or 66.

When the combination of the CA_2A-48A-66A downlink band and the CA_48A-66A uplink band is configured in the terminal, the terminal may receive the downlink signal through at least one of the downlink operating bands 2, 48, and/or 66.

For reference, the order in which steps S1220 and S1230 are performed may be different from that shown in FIG. 12. For example, step S1230 may be performed first and then step S1220 may be performed. Alternatively, step S1220 and step S1230 may be performed simultaneously. Alternatively, the time when step S1220 and step S1230 may be may overlap partially.

<Communication System to which the Disclosure of this Specification is to be Applied>

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 13:
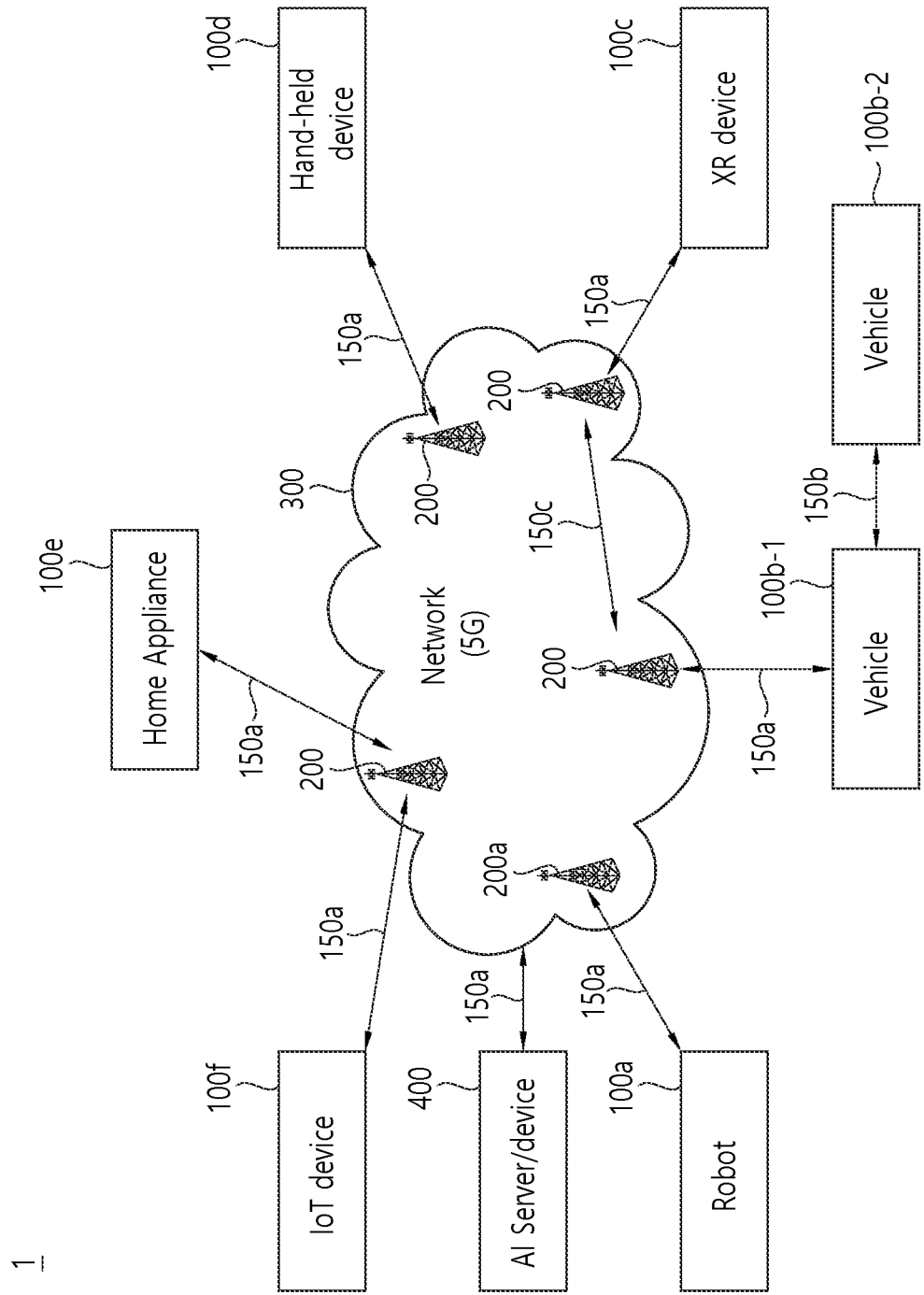
FIG. 13 illustrates a communication system 1 that can be applied to the present specification.

FIG. 13 Illustrates a Communication System 1 that can be Applied to the Present Specification.

Referring to FIG. 13, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device.

Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like.

Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like.

The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300.

The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like.

The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

FIG. 14 Illustrates an Example of a Wireless Device that can be Applied to the Present Specification.

Referring to FIG. 14, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 13}. Here, x of 100x may be at least one of a, b-1, b-2, c, d, f and/or e.

The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein.

For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104.

The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein.

Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein.

For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204.

The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein.

Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described as being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto.

For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein.

One or more processors 102, 202 may generate messages, control information, data or information in accordance with the descriptions, functions, procedures, suggestions, methods and/or operational flowcharts disclosed herein.

One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206.

One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

One or more processors 102, 202 may be referred to as a controller, microcontroller, microprocessor, or microcomputer. One or more processors 102, 202 may be implemented by hardware, firmware, software, or a combination thereof.

For example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in one or more processors 102, 202.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals.

For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208.

In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 15:
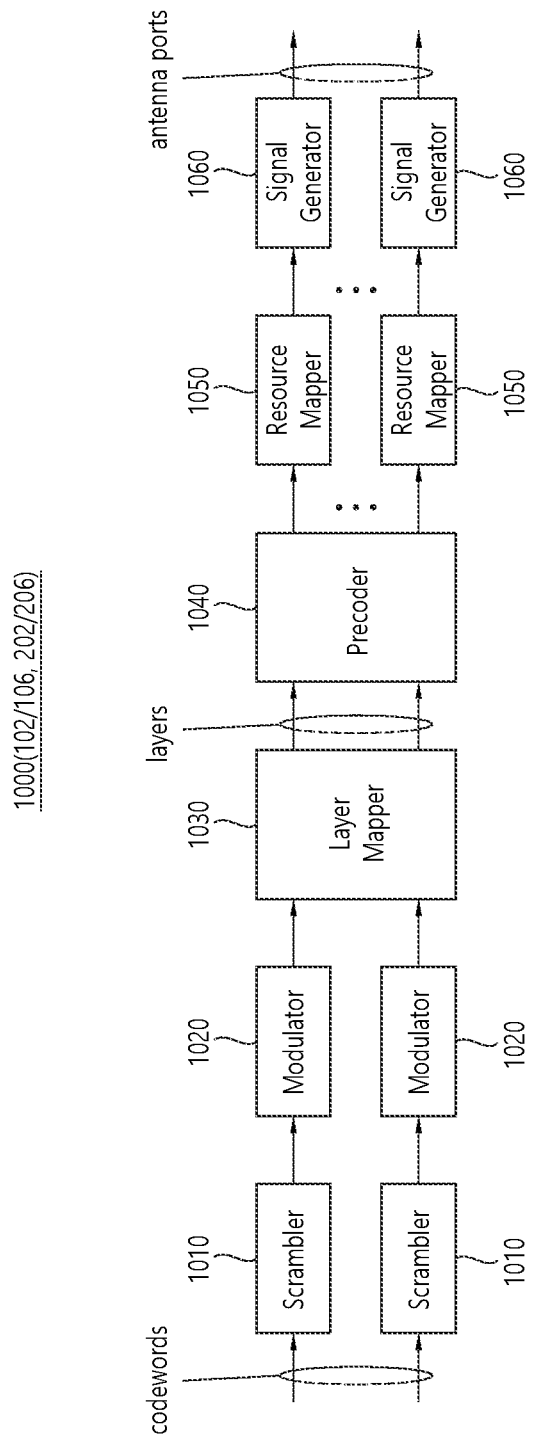
FIG. 15 illustrates an example of a signal processing circuit for a transmission signal that can be applied to the present specification.

FIG. 15 Illustrates an Example of a Signal Processing Circuit for a Transmission Signal that can be Applied to the Present Specification.

Referring to FIG. 15, the signal processing circuit 1000 may include a scrambler 1010, a modulator 1020, a layer mapper 1030, a precoder 1040, a resource mapper 1050, and a signal generator 1060.

Although not limited thereto, the operations/functions of FIG. 15 may be performed in the processor (102, 202), the memory (104, 204) and/or transceiver (106, 206) of FIG. 14.

The hardware element of FIG. 15 may be implemented in the processors 102 and 202 and/or the transceivers 106 and 206 of FIG. 14. For example, blocks 1010-1060 may be implemented in the processors 102, 202 of FIG. 14. Also, blocks 1010-1050 may be implemented in the processors 102 and 202 of FIG. 14, and block 1060 may be implemented in the transceivers 106 and 206 of FIG. 14.

The codeword may be converted into a wireless signal through the signal processing circuit 1000 of FIG. 15. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like.

The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010-1060 of FIG. 15. For example, a wireless device (e.g., 100 and 200 of FIG. 14) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 16:
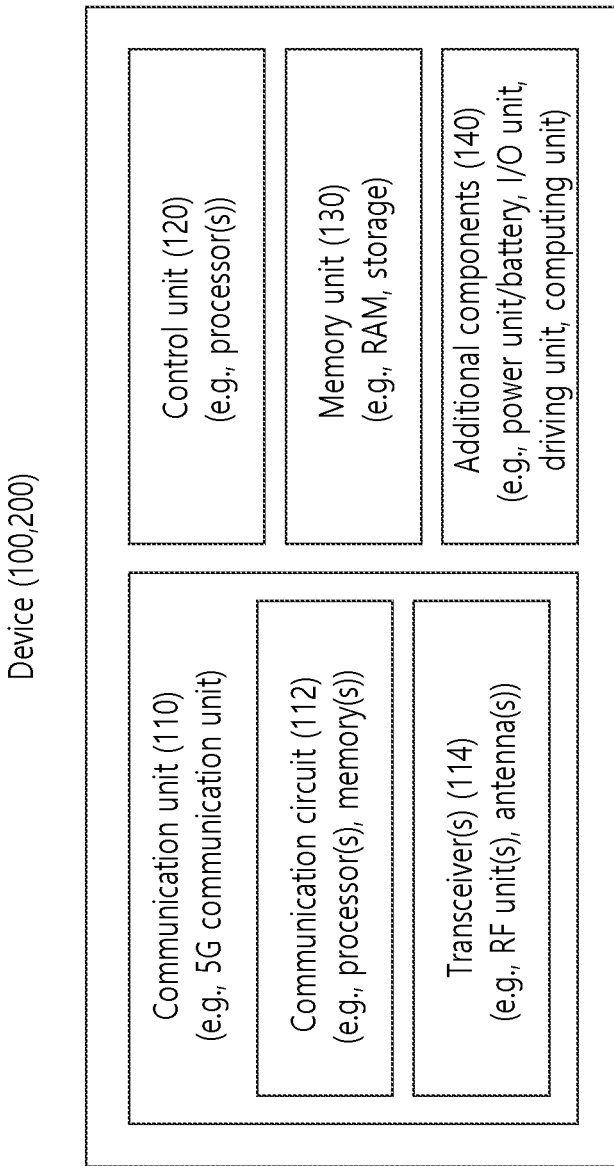
FIG. 16 illustrates another example of a wireless device that can be applied to the present specification.

FIG. 16 Illustrates Another Example of a Wireless Device that can be Applied to the Present Specification.

The wireless device may be implemented in various forms according to a use-example/service (see FIGS. 12 and 16-18).

Referring to FIG. 16, the wireless devices 100 and 200 correspond to the wireless devices 100 and 200 of FIG. 14, and the wireless devices 100 and 200 may be configured with various elements, components, units, and/or modules.

For example, the wireless device 100, 200 may include a communication unit 110, a control unit 120, a memory unit 130, and additional components 140. The communication unit may include communication circuit 112 and transceiver (s) 114.

For example, the communication circuit 112 may include one or more processors 102, 202 and/or one or more memories 104, 204 of FIG. 14. For example, the transceiver (s) 114 may include one or more transceivers 106, 206 and/or one or more antennas 108, 208 of FIG. 14.

The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130.

In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 14. For example, the memory unit 130 may include one or more memories 104 and 204 of FIG. 14.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 13, 100a), a vehicle (FIG. 13, 100b-1, 100b-2), an XR device (FIG. 13, 100c), a portable device (FIG. 13, 100d), a home appliance. (FIG. 13, 100e), IoT devices (FIG. 13, 100f), terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 16, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Hereinafter, the implementation example of FIG. 16 will be described in more detail with reference to the accompanying drawings.

Figure 17:
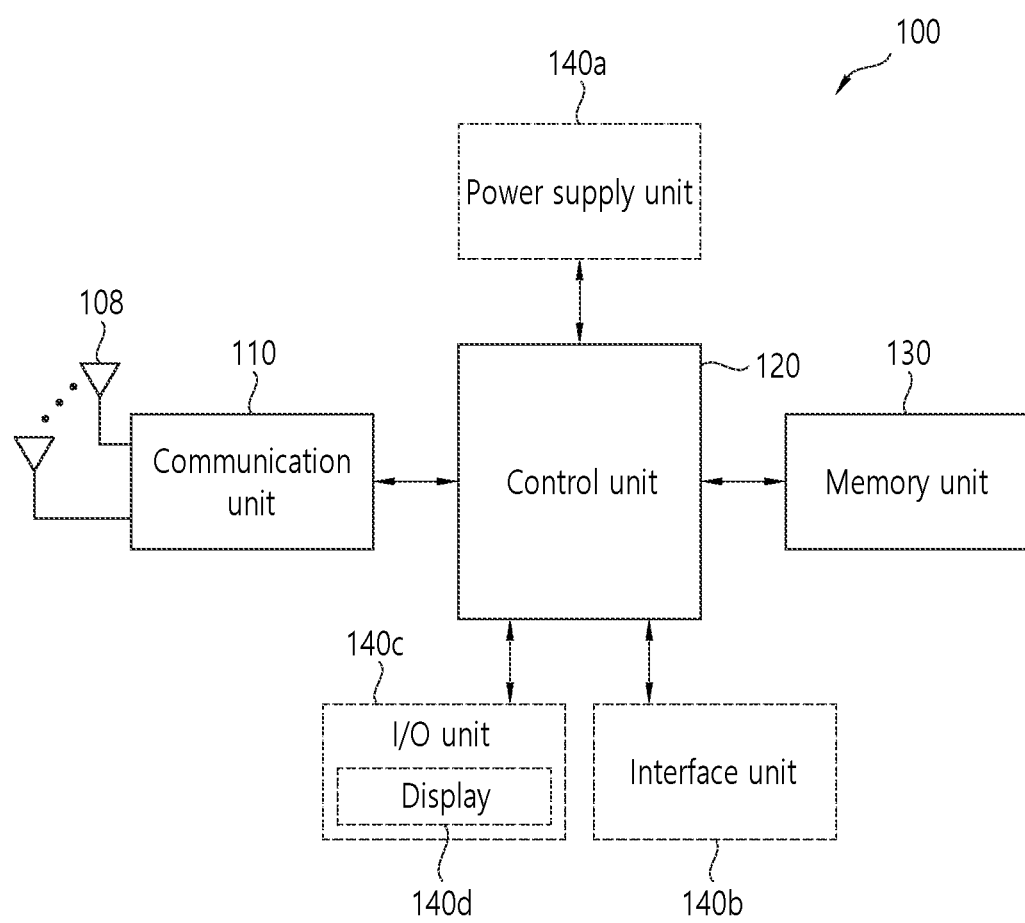
FIG. 17 illustrates an example of a mobile device that can be applied to the present specification.

FIG. 17 Illustrates an Example of a Mobile Device that can be Applied to the Present Specification.

The mobile device may include a smart phone, a smart pad, a wearable device (e.g., smart watch, smart glasses), and a portable computer (e.g., a laptop, etc.). The mobile device may be referred to as a mobile station (MS), a user terminal (UT), a mobile subscriber station (MSS), a subscriber station (SS), an advanced mobile station (AMS), or a wireless terminal (WT).

Referring to FIG. 17, the portable device 100 includes an antenna unit 108, a communication unit 110, a control unit 120, a memory unit 130, a power supply unit 140a, an interface unit 140b, and an input/output unit 140c. The antenna unit 108 may be configured as part of the communication unit 110. Blocks 110 to 130/140a to 140c respectively correspond to blocks 110 to 130/140 of FIG. 16.

The communication unit 110 may transmit and receive signals (e.g., data, control signals, etc.) with other wireless devices and base stations. The control unit 120 may control various components of the portable device 100 to perform various operations. The control unit 120 may include an application processor (AP). The memory unit 130 may store data/parameters/programs/codes/commands necessary for driving the portable device 100. In addition, the memory unit 130 may store input/output data/information and the like.

The power supply unit 140a supplies power to the portable device 100 and may include a wired/wireless charging circuit, a battery, and the like. The interface unit 140b may support the connection of the mobile device 100 to another external device. The interface unit 140b may include various ports (e.g., audio input/output port and video input/output port) for connecting to an external device. The input/output unit 140c may receive or output image information/signal, audio information/signal, data, and/or information input from a user. The input/output unit 140c may include a camera, a microphone, a user input unit, a display unit 140d, a speaker, and/or a haptic module.

For example, in the case of data communication, the input/output unit 140c obtains information/signals (e.g., touch, text, voice, image, and video) input from a user, and the obtained information/signal may be stored in a memory unit 130. The communication unit 110 may convert the information/signal stored in the memory unit 130 into a wireless signal and directly transmit the converted wireless signal to another wireless device or to the base station. In addition, the communication unit 110 may receive a radio signal from another wireless device or a base station, and then restore the received radio signal to original information/signal. The restored information/signal may be stored in the memory unit 130 and then output in various forms (e.g., text, voice, image, video, and haptic) through the input/output unit 140c.

Figure 18:
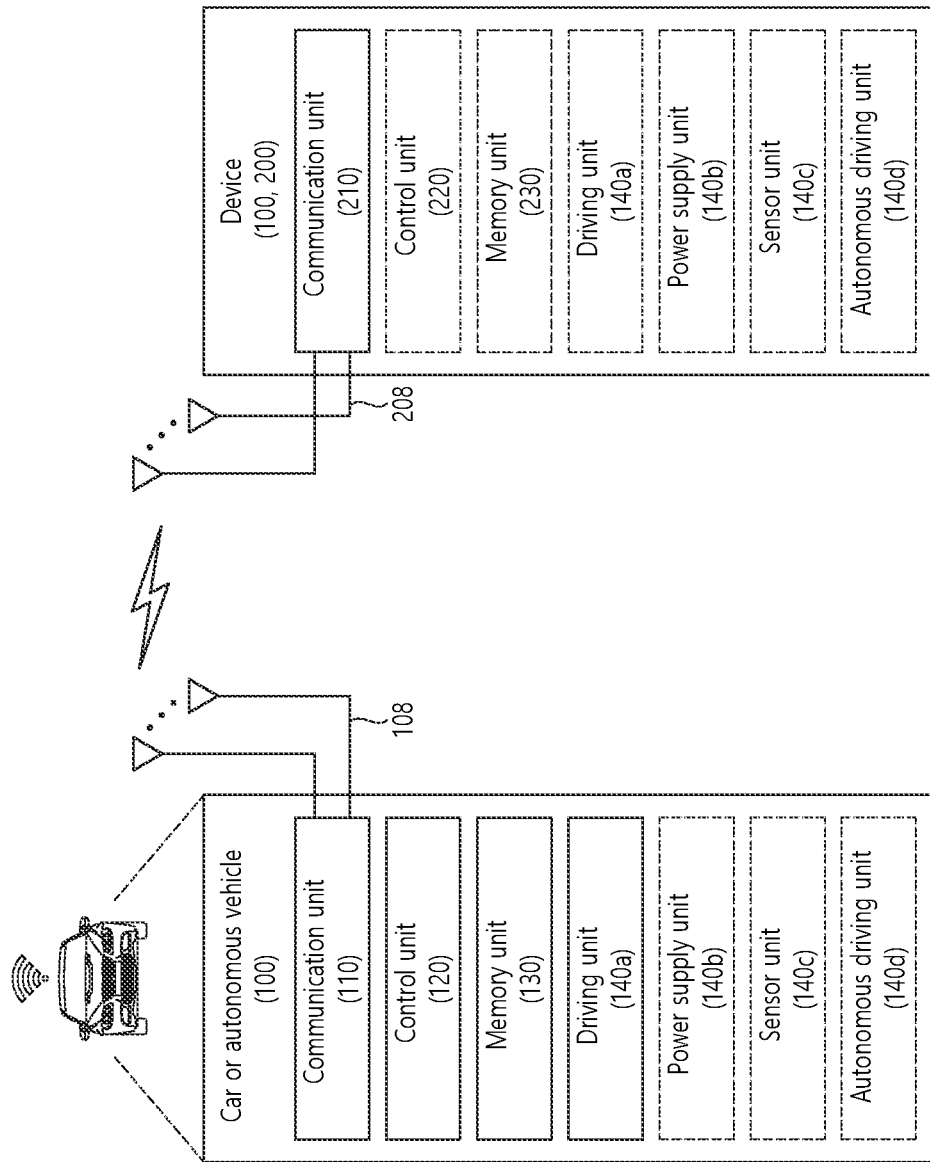
FIG. 18 illustrates an example of a vehicle or an autonomous vehicle that can be applied to the present specification.

FIG. 18 Illustrates an Example of a Vehicle or an Autonomous Vehicle that can be Applied to the Present Specification.

The vehicle or autonomous vehicle may be implemented as a mobile robot, a vehicle, a train, an aerial vehicle (AV), a ship, or the like.

Referring to FIG. 18, the vehicle or the autonomous vehicle 100 may include an antenna unit 108, a communication unit 110, a control unit 120, a driving unit 140a, a power supply unit 140b, a sensor unit 140c, and autonomous driving unit 140d.

The antenna unit 108 may be configured as part of the communication unit 110. The blocks 110/130/140a to 140d may correspond to blocks 110/130/140 of FIG. 16, respectively.

The communication unit 110 may transmit or receive signals (e.g., data, control signals, etc.) with external devices, such as base stations (e.g. base stations, road side units, etc.), servers, and the like.

The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like.

The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles.

In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 19:
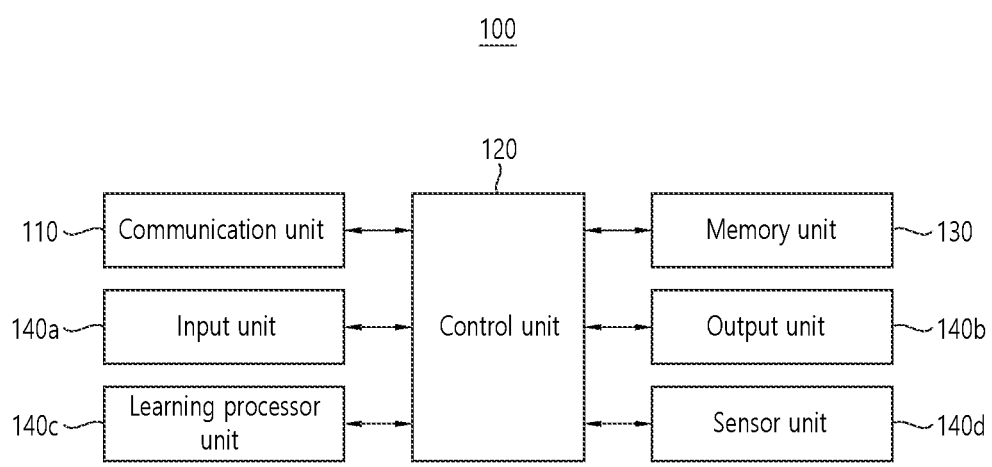
FIG. 19 illustrates an example of an AI device that can be applied to the present specification.

FIG. 19 Illustrates an Example of an AI Device that can be Applied to the Present Specification.

An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 19, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 16.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 13) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm.

In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation.

In addition, the control unit 120 collects history information including the operation contents of the AI device 100 or the user's feedback on the operation, and stores the information in the memory unit 130 or the running processor unit 140c or transmits the information to an external device such as an AI server (FIG. 13, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140*c* may be transmitted to the external device through the communication unit 110 and/or stored in the memory unit 130. As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A device adapted to operate in a wireless system, the device comprising:
    a transceiver;
    at least one processor; and
    at least one computer memory operably connectable to the at least one processor and storing instructions that, based on being executed by the at least one processor, perform operations comprising:
    transmitting, via the transceiver, an uplink signal via two bands among a plurality of Evolved UMTS (Universal Mobile Telecommunications System) Terrestrial Radio Access (E-UTRA) operating bands; and
    receiving, via the transceiver, a downlink signal via three bands among the plurality of E-UTRA operating bands,
    wherein the three bands include at least an E-UTRA operating band 2 and the two bands,
    wherein the two bands include two of E-UTRA operating bands 13, 48, and 66,
    wherein the three bands and the two bands are configured for CA (Carrier Aggregation),
    wherein a MSD (Maximum Sensitivity Degradation) value is applied to a reference sensitivity for receiving the downlink signal based on the E-UTRA operating band 2, and
    wherein the MSD value is 28.3 dB, based on that the two bands are E-UTRA operating bands 48 and 66.

2. The device of claim 1,
    wherein 28.3 dB of the MSD value is based on that a downlink center frequency of the E-UTRA operating band 2 is 1960 MHz.

3. The device of claim 1,
    wherein the MSD value is 6.2 dB, based on that the two bands are E-UTRA operating bands 13 and 66.

4. The device of claim 3,
    wherein 6.2 dB of the pre configured MSD value is pre configured based on that a downlink center frequency of the E-UTRA operating band 2 is 1960 MHz.

5. The device of claim 1,
    wherein the E-UTRA operating band 2 includes 1850 MHz-1910 MHz of uplink operating band and 1930 MHz-1990 MHz of downlink operating band,
    wherein the E-UTRA operating band 13 includes 777 MHz-787 MHz of uplink operating band and 746 MHz-756 MHz of downlink operating band,
    wherein the E-UTRA operating band 48 includes 3550 MHz-3700 MHz of uplink operating band and downlink operating band, and
    wherein the E-UTRA operating band 66 includes 1710 MHz-1780 MHz of uplink operating band and 2110 MHz-2200 MHz of downlink operating band.

6. A method performed by a device operating in a wireless communication system, the method comprising:
    transmitting an uplink signal via two bands among a plurality of Evolved UMTS (Universal Mobile Telecommunications System) Terrestrial Radio Access (E-UTRA) operating bands,
    wherein the device is configured with the plurality of E-UTRA operating bands; and
    receiving a downlink signal via three bands among the plurality of E-UTRA operating bands,
    wherein the three bands include at least an E-UTRA operating band 2 and the two bands,
    wherein the two bands include two of E-UTRA operating bands 13, 48, and 66,
    wherein the three bands and the two bands are configured for CA (Carrier Aggregation),
    wherein a MSD (Maximum Sensitivity Degradation) value is applied to a reference sensitivity for receiving the downlink signal based on the E-UTRA operating band 2, and
    wherein the MSD value is 28.3 dB, based on that the two bands are E-UTRA operating bands 48 and 66.

7. The method of claim 6,
    wherein 28.3 dB of the MSD value is based on that a downlink center frequency of the E-UTRA operating band 2 is 1960 MHz.

8. The method of claim 6,
    wherein the MSD value is 6.2 dB, based on that the two bands are E-UTRA operating bands 13 and 66.

9. The method of claim 8,
    wherein 6.2 dB of the MSD value is based on that a downlink center frequency of the E-UTRA operating band 2 is 1960 MHz.

10. The method of claim 6,
    wherein the E-UTRA operating band 2 includes 1850 MHz-1910 MHz of uplink operating band and 1930 MHz-1990 MHz of downlink operating band,
    wherein the E-UTRA operating band 13 includes 777 MHz-787 MHz of uplink operating band and 746 MHz-756 MHz of downlink operating band,
    wherein the E-UTRA operating band 48 includes 3550 MHz-3700 MHz of uplink operating band and downlink operating band, and
    wherein the E-UTRA operating band 66 includes 1710 MHz-1780 MHz of uplink operating band and 2110 MHz-2200 MHz of downlink operating band.

11. A device adapted to operate in a wireless system, the device comprising:
    a transceiver;
    at least one processor; and at least one computer memory operably connectable to the at least one processor and storing instructions that, based on being executed by the at least one processor, perform operations comprising:

transmitting, via the transceiver, an uplink signal via two bands among a plurality of Evolved UMTS (Universal Mobile Telecommunications System) Terrestrial Radio Access (E-UTRA) operating bands; and receiving, via the transceiver, a downlink signal via three bands among the plurality of E-UTRA operating bands, wherein the three bands include at least an E-UTRA operating band 2 and the two bands, wherein the two bands include two of E-UTRA operating bands 13, 48, and 66, wherein the three bands and the two bands are configured for CA (Carrier Aggregation), wherein a MSD (Maximum Sensitivity Degradation) value is applied to a reference sensitivity for receiving the downlink signal based on the E-UTRA operating band 2, and wherein the MSD value is 6.2 dB, based on that the two bands are E-UTRA operating bands 13 and 66.

* * * * *